(12) United States Patent
    Kollias

(10) Patent No.: US 9,938,012 B1
(45) Date of Patent: *Apr. 10, 2018

(54) COLLAPSIBLE ARTICLE ORGANIZER FOR AIRLINER USE

(71) Applicant: Michael C. Kollias, Chicago, IL (US)

(72) Inventor: Michael C. Kollias, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/584,503

(22) Filed: Dec. 29, 2014

Related U.S. Application Data

(63) Continuation-in-part of application No. 14/088,490, filed on Nov. 25, 2013.

(60) Provisional application No. 61/921,794, filed on Dec. 30, 2013.

(51) Int. Cl.
| | |
|---|---|
| *B62J 11/00* | (2006.01) |
| *B64D 11/00* | (2006.01) |
| *B64D 11/06* | (2006.01) |
| *B60R 9/02* | (2006.01) |
| *B60R 7/10* | (2006.01) |

(52) U.S. Cl.
CPC ............... *B64D 11/00* (2013.01); *B60R 7/10* (2013.01); *B60R 9/02* (2013.01); *B64D 11/00152* (2014.12); *B64D 11/0638* (2014.12)

(58) Field of Classification Search
CPC .. B60R 7/10; B60R 9/02; B60N 3/103; B64D 11/0638; B64D 11/00152
USPC ............... 224/482, 414; 248/311.2
See application file for complete search history.

(56) References Cited

U.S. PATENT DOCUMENTS

| | | | | |
|---|---|---|---|---|
| 1,915,958 A | * | 6/1933 | Skirrow | B60N 3/007 108/44 |
| 1,933,374 A | * | 10/1933 | Haggard | A47F 5/08 211/90.01 |
| 2,616,647 A | | 11/1952 | Murchinson | |
| 3,163,287 A | * | 12/1964 | Barnett | A47G 23/0641 108/44 |
| 3,367,610 A | | 2/1968 | Lindquist | |
| 3,712,235 A | * | 1/1973 | Russ | B60N 3/103 108/46 |
| 4,275,862 A | * | 6/1981 | Takagi | A45D 27/29 248/205.3 |
| 4,630,319 A | * | 12/1986 | Mathis | A41D 27/20 2/250 |
| 4,653,637 A | * | 3/1987 | Wallace | B25H 3/04 206/372 |

(Continued)

*Primary Examiner* — Adam Waggenspack
*Assistant Examiner* — Lester L Vanterpool
(74) *Attorney, Agent, or Firm* — Thomas Paulius; The Law Office of Konrad Sherinian

(57) ABSTRACT

An article organizer includes three interconnected panels which are foldable relative to each other from a flat position to an assembled position. One panel is a base panel that can be attached to a window frame of an airline cabin window. A second panel is a support panel that extends outwardly from the base panel, transversely thereto and has openings into which articles may be placed. The third panel is a brace panel that extends at an angle to the base and support panels and which gives the organizer an overall triangular shape. The openings in the support panel may be configured to receive articles of different configurations, and at least the base panel may also include structure that engages a portion of the tray table of an airliner passenger seat.

20 Claims, 20 Drawing Sheets

(56) References Cited

U.S. PATENT DOCUMENTS

| | | | | |
|---|---|---|---|---|
| 4,728,018 | A * | 3/1988 | Parker | B60N 3/102 224/544 |
| 4,858,796 | A | 8/1989 | Roth | |
| 4,893,773 | A * | 1/1990 | Fujimoto | B60N 3/103 248/215 |
| 4,953,772 | A * | 9/1990 | Phifer | B60N 3/102 220/737 |
| 5,100,090 | A * | 3/1992 | Drower | A47B 96/027 108/152 |
| 5,141,194 | A * | 8/1992 | Burgess | B60N 3/102 248/150 |
| 5,641,079 | A * | 6/1997 | Schmidt | A47F 5/0823 211/104 |
| 6,036,152 | A * | 3/2000 | Hiscox | B60N 3/102 224/281 |
| 6,068,127 | A * | 5/2000 | Hunter | B65D 5/3621 206/194 |
| 6,176,405 | B1 | 1/2001 | Roach | |
| 6,371,428 | B1 | 4/2002 | Zorich et al. | |
| 6,666,149 | B1 * | 12/2003 | Lathrop | B60N 3/004 108/152 |
| 9,064,434 | B2 * | 6/2015 | Alford | B60N 3/103 |
| 9,296,324 | B2 * | 3/2016 | Mango | B60N 3/103 |
| 9,604,434 | B2 * | 3/2017 | Oh | B32B 27/08 |
| 2010/0288900 | A1 * | 11/2010 | Janik | B60R 11/0241 248/315 |
| 2013/0062382 | A1 * | 3/2013 | Alford | B60N 3/103 224/482 |

\* cited by examiner

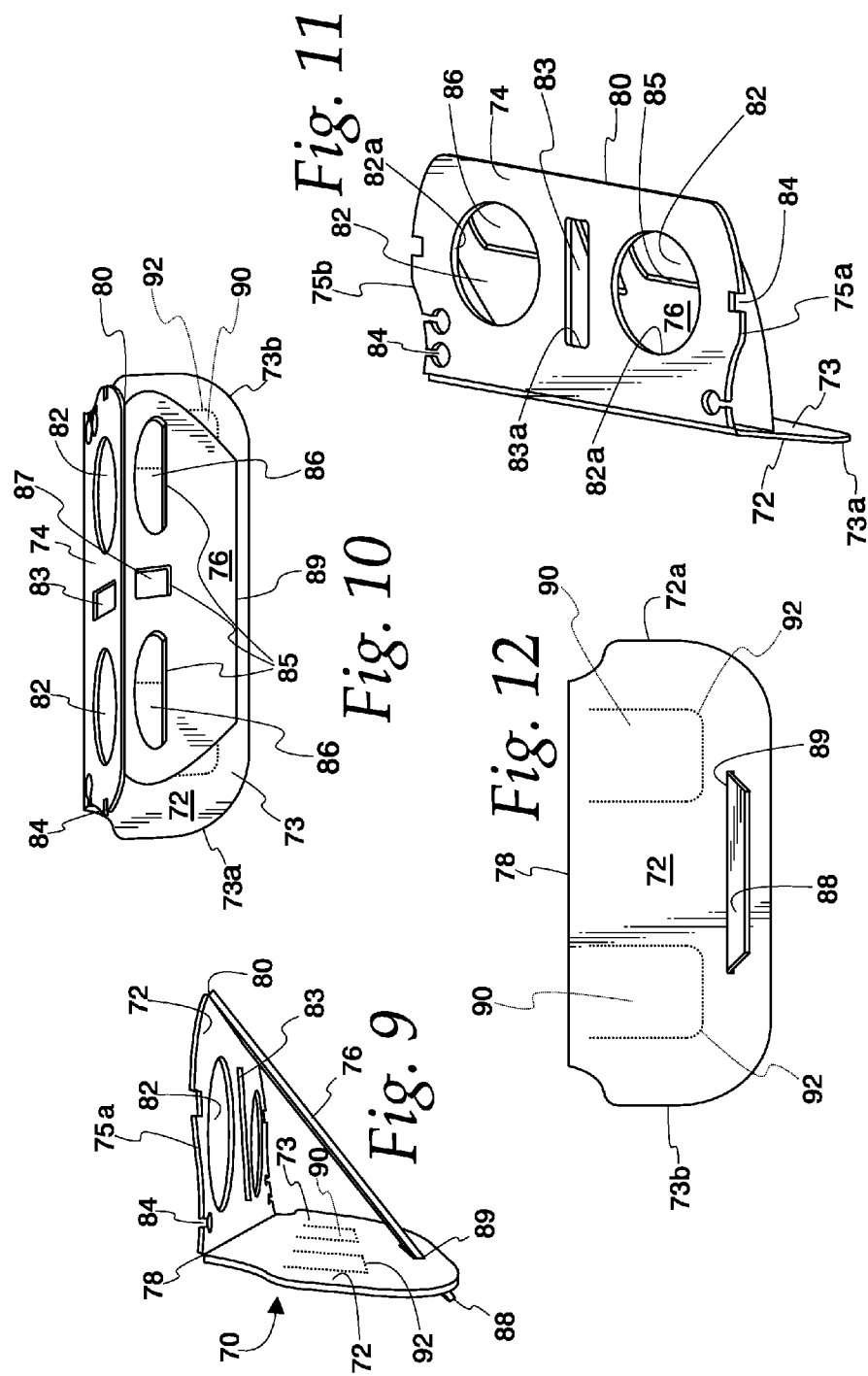

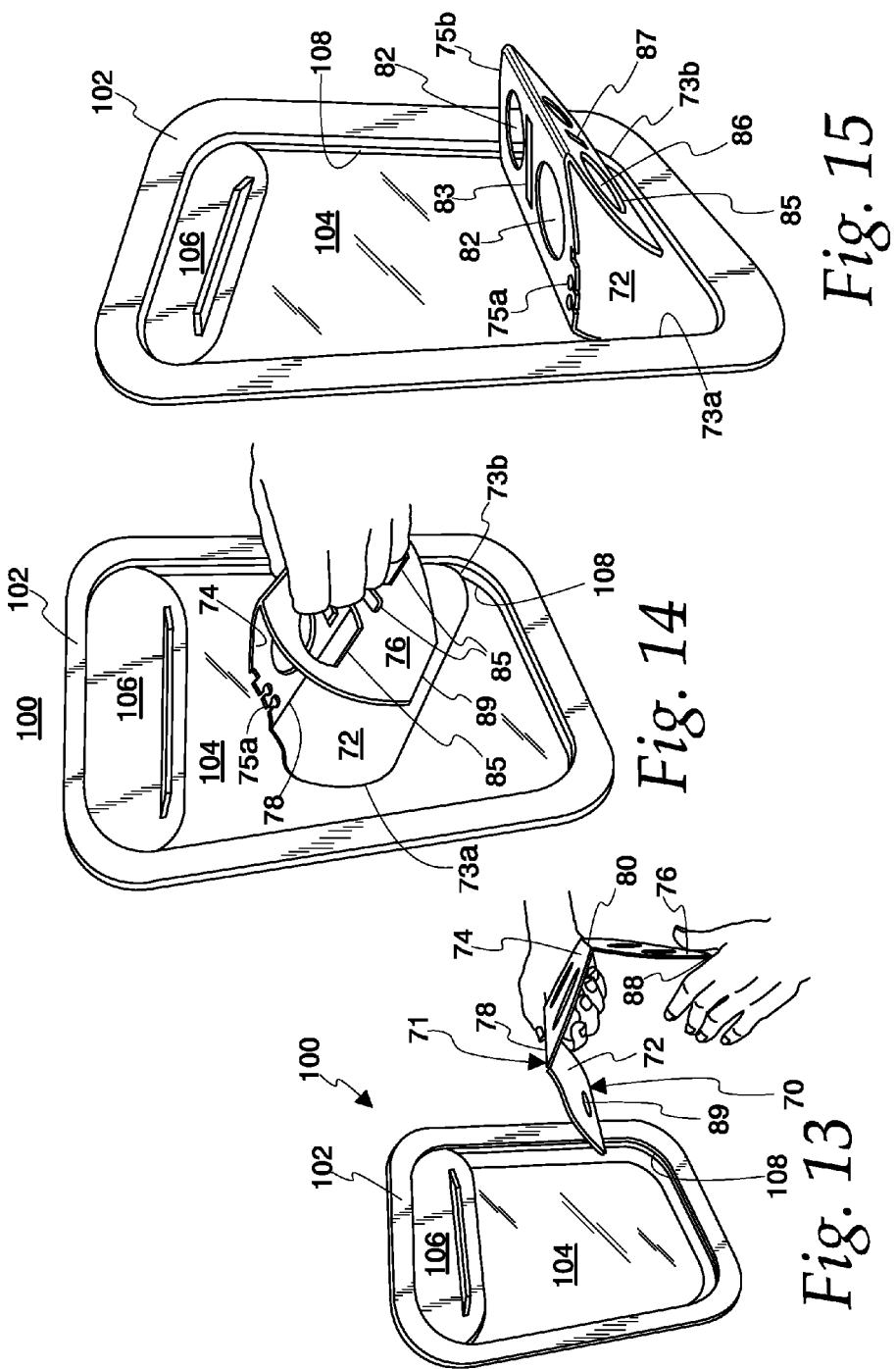

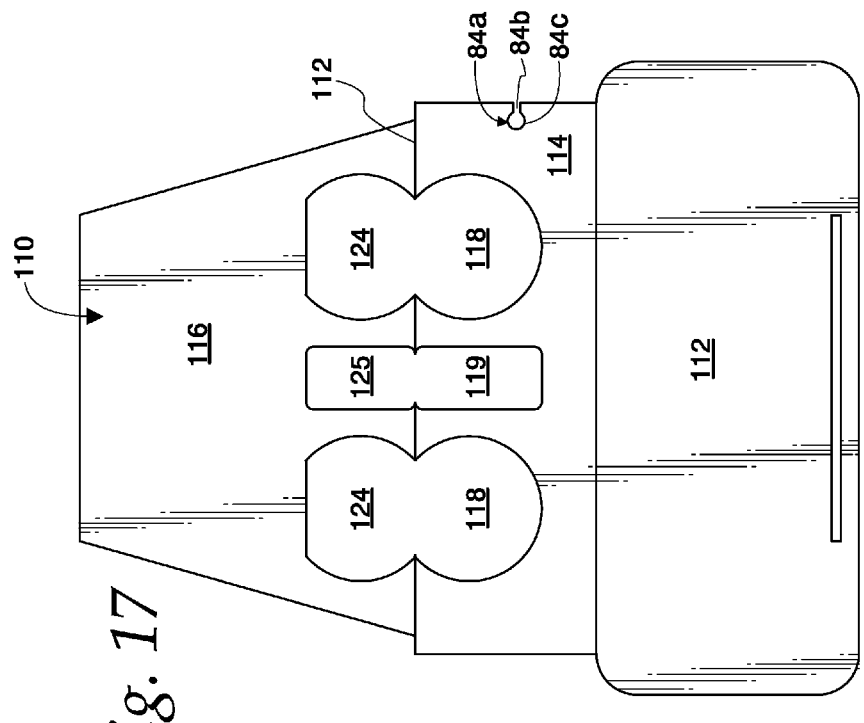
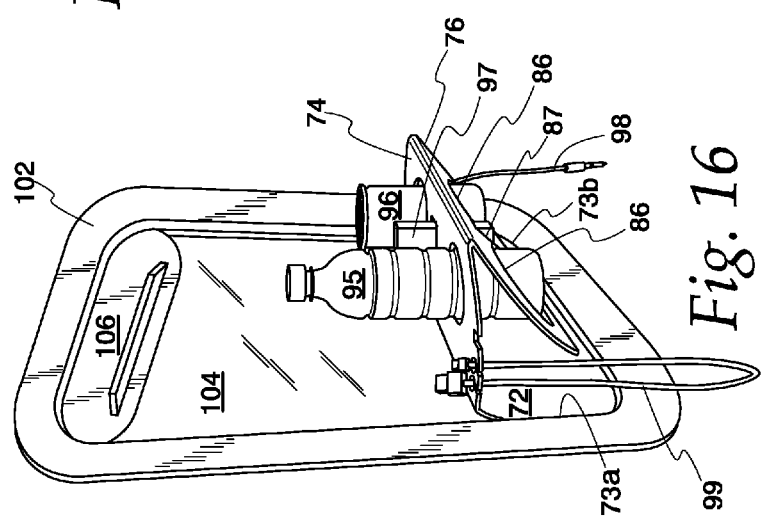

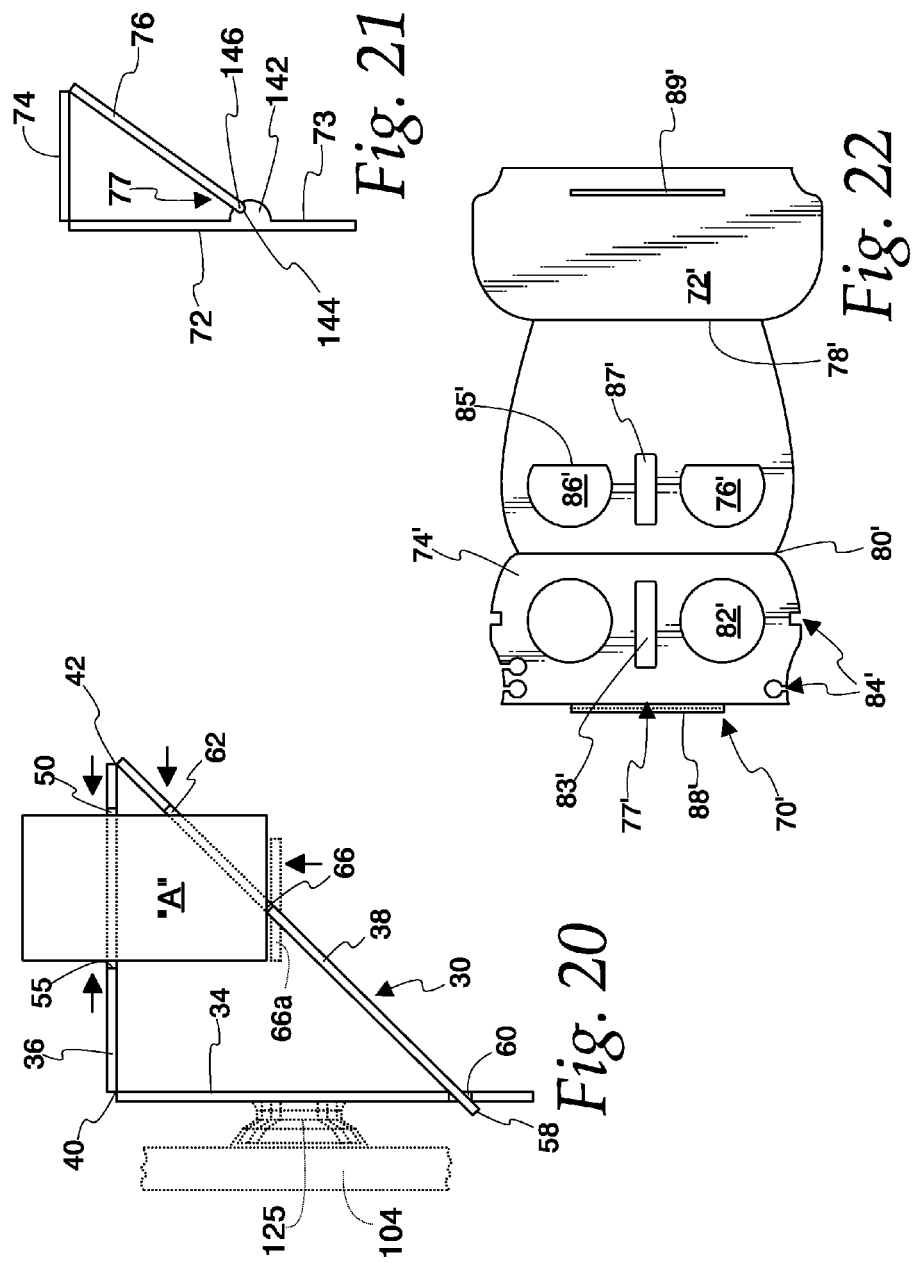

ns. Air travel has become a necessity in today's business world. Often, an airline passenger will bring work onto an airliner which requires him or her to use a laptop computer. The laptop takes up most of the space on the drop down tray and so the passenger is often precluded from having a beverage on the flight. Additionally, the passenger may have an MP3 player or smart phone that requires attention. This device has to be put in the seat pocket in front of the passenger to make room. There is no suitable device known to me that permits a passenger to utilize cabin wall space for an article organizer that can hold a passenger's beverage, smart phone, PDA, pens and the like either alone, or in combination. Nor is there any suitable device that has openings which can accommodate a variety of different articles in the same opening, nor attach to an airliner window or to an airliner passenger chair.

COLLAPSIBLE ARTICLE ORGANIZER FOR AIRLINER USE

REFERENCE TO RELATED APPLICATIONS

This application is a continuation-in-part application of prior application Ser. No. 14/088,490, filed 25 Nov. 2013 and entitled, "Collapsible Article Organizer for Airliner Use". I hereby claim priority of both prior U.S. provisional application Ser. No. 61/921,794, filed 30 Dec. 2013, entitled "Article Organizer for Airliner Use with Versatile Openings" and of the aforesaid prior application Ser. No. 14/088,490, filed 25 Nov. 2013 and entitled, "Collapsible Article Organizer for Airliner Use." Both of said applications are hereby incorporated herein by reference.

BACKGROUND OF THE DISCLOSURE

The present disclosure relates generally to article organizers and more particularly, to improved article organizer that is formed from a single sheet of planar material and which may be folded into a flat, storage condition and then simply assembled into an operating condition.

Air travel has become a necessity in today's business world. Often, an airline passenger will bring work onto an airliner which requires him or her to use a laptop computer. The laptop takes up most of the space on the drop down tray and so the passenger is often precluded from having a beverage on the flight. Additionally, the passenger may have an MP3 player or smart phone that requires attention. This device has to be put in the seat pocket in front of the passenger to make room. There is no suitable device known to me that permits a passenger to utilize cabin wall space for an article organizer that can hold a passenger's beverage, smart phone, PDA, pens and the like either alone, or in combination. Nor is there any suitable device that has openings which can accommodate a variety of different articles in the same opening, nor attach to an airliner window or to an airliner passenger chair.

The present disclosure is therefore directed to an article organizer for supporting articles, such as a beverage container, a smart phone or similar electronic device that is particularly suitable for airline use and which is collapsible from its assembled position to a flat, generally planar position.

SUMMARY OF THE PRESENT DISCLOSURE

Accordingly, there is provided a multi-panel article organizer that suitable for airline use, which is appropriately sized and which folds flat when not in use.

In accordance with one embodiment as described in the following disclosure, I have developed an article organizer which is preferably formed from a planar member that includes three distinct panels which are preferably interconnected with each other in a manner so that each panel is hingedly connected to an adjacent panel. The three panels are folded along two spaced-apart fold lines and one of the panels engages an opposing panel to form a triangular shaped structure that has openings which accommodate beverage containers, smart phones, PDAs, pens, pencils, phones and connecting cords and the like which a traveler is likely to carry with him/her on board an airliner. The article organizers of the present disclosure have a folded structure which permits them to be assembled from a flat, unassembled condition into a triangular, assembled condition and when in their unassembled condition, are configured to be easily carried in a briefcase, laptop case, file folder or the like.

The three panels preferably include a base panel that has a vertical orientation and which engages a window frame of a window of the airliner, a support panel that is connected to the base panel and supported at preferably a right angle thereto, and a brace panel that braces and supports the support panel in its projection with respect to the base panel. In one embodiment, the brace panel is hingedly connected to the support panel at one end thereof and along a first fold line of the blank, and it further has a free end at the opposite end thereof that engages the base panel to hold up the support panel in its horizontal orientation. In another embodiment, the support panel is hingedly connected at one end thereof to the brace panel along a second fold line of the blank and has a free end at its opposite end which engages the base panel to orient the support panel in a preferred orientation, which is substantially a right angle to the base panel.

The support panel includes a plurality of openings disposed in it, and each opening is sized to accommodate a certain article therein. Thus, the article organizers of the present disclosure have openings that are sized and configured to receive beverage containers, smart phones, PDAs and other electronic devices, and pens, pencils, headphones and connecting cables or the like. The larger articles, such as the smart phones, and beverage containers project through the support panel openings in a downward direction and extend for a preselected distance where they contact portions of the brace panel along their bottom surfaces.

The brace panel also contains similar, and preferably, differently sized and configured openings that are aligned with the support panel openings. For most instances, the brace panel openings will have a smaller area than that of their corresponding support panel openings. In this regard, the brace panel openings are preferably aligned with the support panel openings so as to present an edge that is oriented widthwise generally through the center of associated support panel openings were they to be projected downwardly from the support panels. This edge runs across the width of the support panel openings so that the bottom surfaces of the beverage containers and smart phone or other electronic devices inserted into the support panel opening contact the edge within the perimeter of the support panel openings. The brace panel openings thereby provide an additional means of support to the articles.

The base panel is preferably configured to fit within the confines of an airliner cabin window and preferably also includes a hard edge that fits into the window frame slot which may accommodate the window shade. This manner of engagement reliably holds the base panel in place so that the support and brace panels project at a level which will not interfere with the passenger operating a device on his tray table or reading a book thereon or the like. The hinged construction of the multiple panels do not form a bulky and difficult to carry rigid carrier structure, but a flexible one that permits a passenger to easily carry the article organizers of the present disclosure onto the plane in a briefcase, a laptop case, a large purse, or even a simple file folder. In an alternate construction, other means of attachment to the window are contemplated, such as suction cups.

In yet another embodiment of the present disclosure, the base panel is a planar member that has one or more elongated engagement tabs defined therein by associated U-shaped slots formed in the base panel. These engagement tabs can be used to attach the article organizer onto the tray table of the seat that faces the passenger, while in an up position, so that the article organizer is not limited in its use to passengers using only window seats on an airliner. These tabs and other style clips may engage the tray table of the seat in front of the passenger (in the up position) or they may fit into the space between the body of the passenger seat and the passenger seat tray table.

In yet another embodiment of an article organizer of the present disclosure, the openings formed in the support panel and in the brace panel intersect with each other along the outermost edge of the organizer so that in some instances, the beverage containers may be inserted into the organizer openings in the horizontal direction rather than in the vertical direction.

In another embodiment of an article organizer in accordance with the present disclosure, one or more of the article openings which are formed in the support panel are multi-faceted in the sense that may accommodate therein a plurality of different articles. One such opening has a circular center portion that can accommodate an airline bottle of spirits or TSA approved water bottle, and the opening may include additional slots disposed at the ends thereof so that the one support opening displays an hour glass style configuration. The additional slots of the openings permit the openings to easily engage two different items with different configurations.

Another embodiment that attaches to the back of an airliner passenger seat and it includes a slot formed in the base panel that fits over the passenger seat tray table latch and presents engagement surfaces against which the wing portions of the tray table latch bear. Additionally, the brace panel may be provided with an attachment slot that receives a portion of the tray table latch member so that the brace panel may be engaged with the base panel over the tray table latch member and without the tray table latch member interfering with it. In this manner, the article organizer may be utilized by travelers that do not occupy a window seat. Other means of attachment such as adjustable straps and rubber lanyards or bands may be attache to the base panel for engaging the passenger seat tray table.

These and other objects, features and advantages of the present disclosure will be clearly understood through a consideration of the following detailed description.

BRIEF DESCRIPTION OF THE DRAWINGS

The organization and manner of the structure and operation of the disclosure, together with further objects and advantages thereof, may best be understood by reference to the following detailed description, taken in connection with the accompanying Figures, wherein like reference numerals identify like elements, and in which:

FIG. 9 is an elevational view, taken from the side, of the blank of FIG. 8 in an assembled condition to form an article organizer;

FIG. 10 is a front elevational view of the article organizer of FIG. 9;

FIG. 11 is a top perspective view, as viewed from one side thereof, of the article organizer of FIG. 9;

FIG. 12 is a rear elevational view of the article organizer of FIG. 9;

FIG. 13 is a perspective view of an airline passenger assembling the article organizer in the airliner cabin;

FIG. 14 is a perspective view of the passenger inserting the assembled article organizer of FIG. 13 into an airliner window slot;

FIG. 15 is a perspective view of the assembled article organizer of FIG. 14 in place within the airliner cabin window frame;

FIG. 16 is a perspective view of the assembled article organizer of FIG. 14 in place within an airliner cabin window and supporting a USB patch cord, a water bottle, a smart phone, a beverage container and a set of headphones;

FIG. 17 is a top plan view of a blank used in the construction of a third embodiment of an article organizer in accordance with the principles of the present disclosure;

FIG. 20 is a sectional diagram illustrating how article organizers of the present disclosure support articles, as well as with an alternate means of attaching the base panel to an airline cabin window;

FIG. 21 is an diagrammatic view of an alternate manner in which the brace panel may engage the base panel, as by way of an interengaging tongue and groove arrangement;

FIG. 22 is a top plan view of a multi-panel blank that may be used to form the article organizer of FIG. 19;

FIG. 35E is an elevational view of an alternate construction of an engagement member in the form of a hook member that is movably mounted to the base panels by way of journals or the like;

DETAILED DESCRIPTION OF THE DISCLOSURE

While the present disclosure may be susceptible to embodiment in different forms, there is shown in the Figures, and will be described herein in detail, specific embodiments, with the understanding that the disclosure is to be considered an exemplification of the principles of the present disclosure, and is not intended to limit the present disclosure to that as illustrated.

In the illustrated embodiments, directional representations—i.e., up, down, left, right, front, rear and the like, used for explaining the structure and movement of the various elements of the present disclosure, are relative. These representations are appropriate when the elements are in the position shown in the Figures. If the description of the position of the elements changes, however, it is assumed that these representations are to be changed accordingly.

Figure 1:
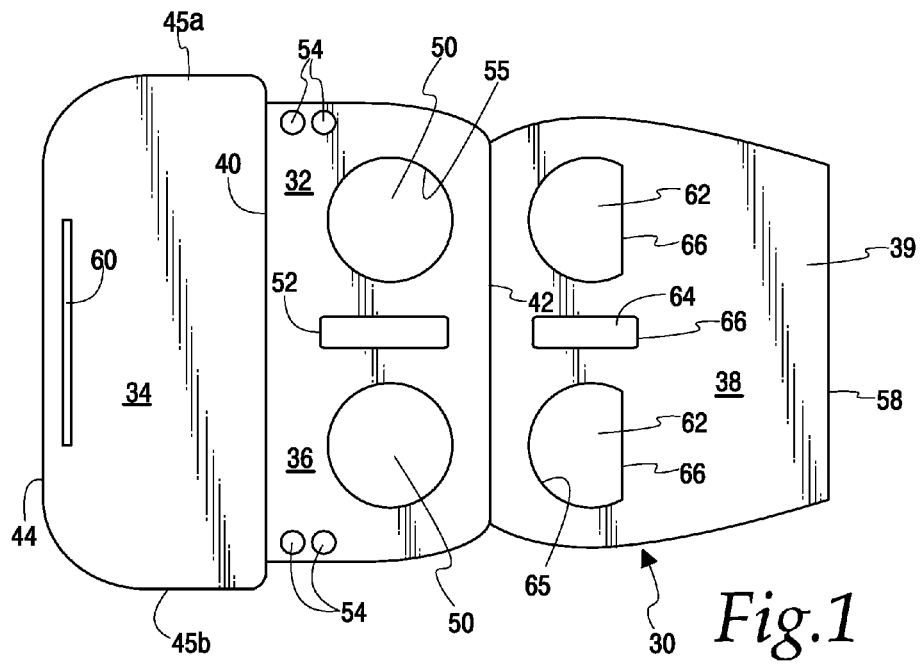
FIG. 1 is a top plan view of a blank used in the construction of a first embodiment of an article organizer in accordance with the principles of the present disclosure.
Figure 2:
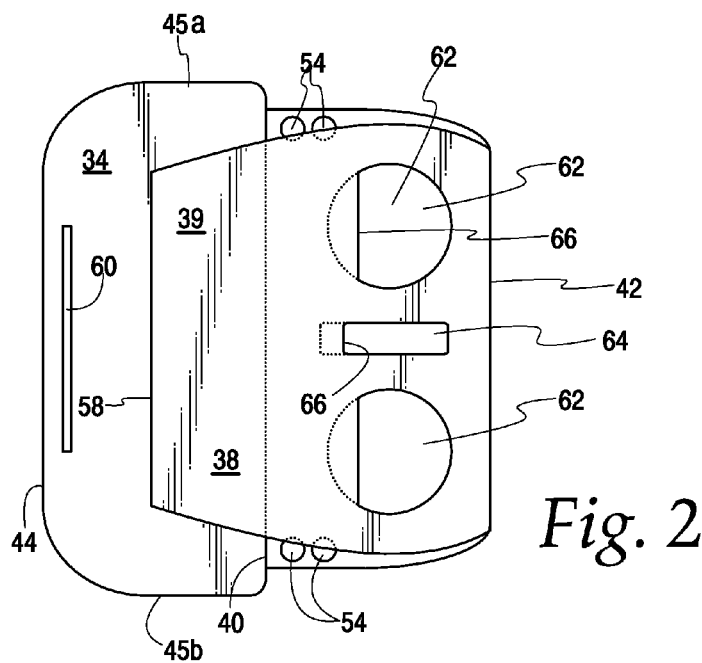
FIG. 2 is a same view as FIG. 1, but with the brace panel folded over onto the remainder of the blank to illustrate a storage condition of the article organizer.

Turning now to FIG. 1, a first embodiment of an article organizer 30 constructed in accordance with the principles of the present invention is shown as taking the form of a generally planar, multi-panel blank 32. The blank 32 has three panels 34, 36, 38 that are hingedly, or otherwise, interconnected to each other along two distinct, first and second fold lines 40 and 42. The three panels include a base panel 34 at one end of the blank 32 that is interconnected to an intermediate support panel 36, which in turn is interconnected to a brace panel 38 that terminates in a free end 39. For storage purposes, as illustrated in FIG. 2, the blank 32 may be reduced in size from its unfolded, operating condition by folding it upon itself. Specifically, in the embodiment illustrated in FIGS. 1-7, the brace panel 38 is folded along second fold line 42 so that it lies flat primarily upon the support panel 36 and a portion of the base panel 34. In this manner, a user may easily store the organizer 30 in a briefcase, a purse, a laptop bag, a file folder or portfolio or the like, as the footprint of the organizer 30 shown is less than about 9 by 12 inches and preferably less than about 8½ by 11 inches.

With this type of footprint, the article organizers of the present disclosure are inherently flexible and simple to carry in a briefcase, laptop case or even a file folder in instances where the folded dimensions are about 9×14 inches or less. In another aspect, the base panel 34 may be folded around fold line 40 onto the intermediate support panel 36, and then the brace panel 38 folded over that to further reduce the overall size of the organizer in an unassembled condition. This is in contrast to beverage holders that are rigidly formed and which cannot be folded from their large and bulky operating condition into a relatively flat member as with the article organizers of the present disclosure.

Figure 23:
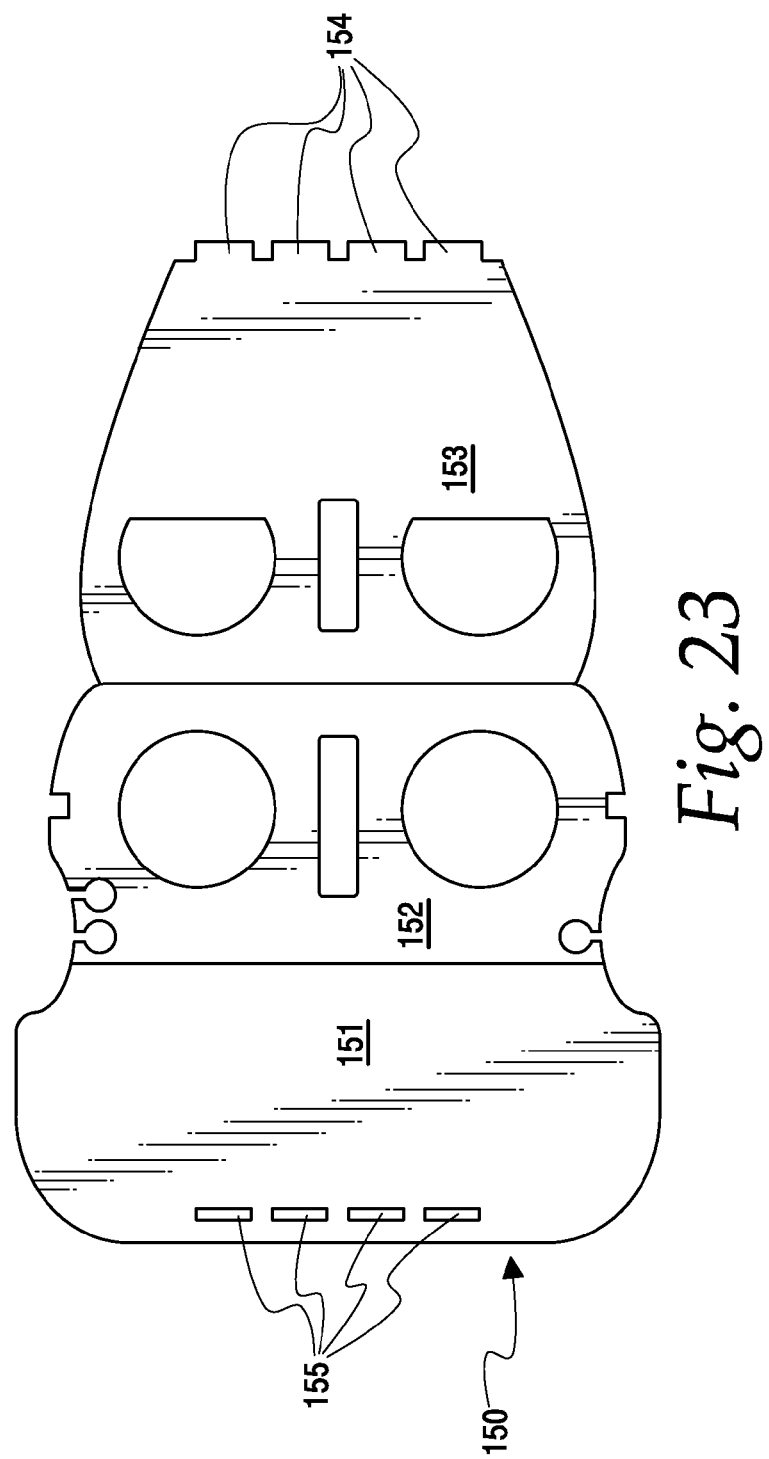
FIG. 23 is a top plan view of yet another embodiment of an article organizer which utilizes multiple interengaging slots and tabs as an means for attaching the ends of two panels together.

The blank 32 is easily assembled into an assembled, or usable condition, by forming a triangular structure. In this regard, the support panel 36 is folded outwardly with respect to the base panel 34 along first fold line 40 and the brace panel 38 is folded downwardly with respect to the support panel 36 along second fold line 42. The brace panel free end 39 is configured to form an engagement tab 58 that is received within an associated complementary slot 60 that is disposed in the base panel 34 proximate the base panel bottom edge 44 as illustrated in FIG. 4. Although shown in the drawings, such as FIGS. 1-18, as a slot-tab engagement structure, it will be understood that other engagement structures may be provided. For example, the base panel 34 may include a raised bar, or ridge against which the brace panel free end 39 rests, or it may include a series of slots that receive complementary tabs, plugs, lugs or the like formed along the brace panel free end 39, similar to what is illustrated in FIG. 23.

It will be understood that other means of engaging two of the panels together may be utilized, and that which are shown in the drawings are not meant to be limiting. Although in FIGS. 1 and 2, the engagement tab 58 and corresponding opposing engagement slot 60 are shown as having a width equal to the rightmost edge of the blank 30, it is contemplated that the engagement tab may be smaller in size as shown in phantom at 160, as well as the corresponding engagement slot 163. With such a smaller size, a user is able to easily push the engagement tab 160 into the opposing slot 163 of the base panel 34. In order to provide a means for retaining the engagement tab 160 in engagement with the base panel 34, a raised portion, such as a detent, or bump 161 may be provided on either side of the engagement tab 160. This bump 161 will catch on the slot 163 and serve to keep the engagement tab 160 engaged with the slot 163 and from pulling free from the slot 163.

Figure 3:
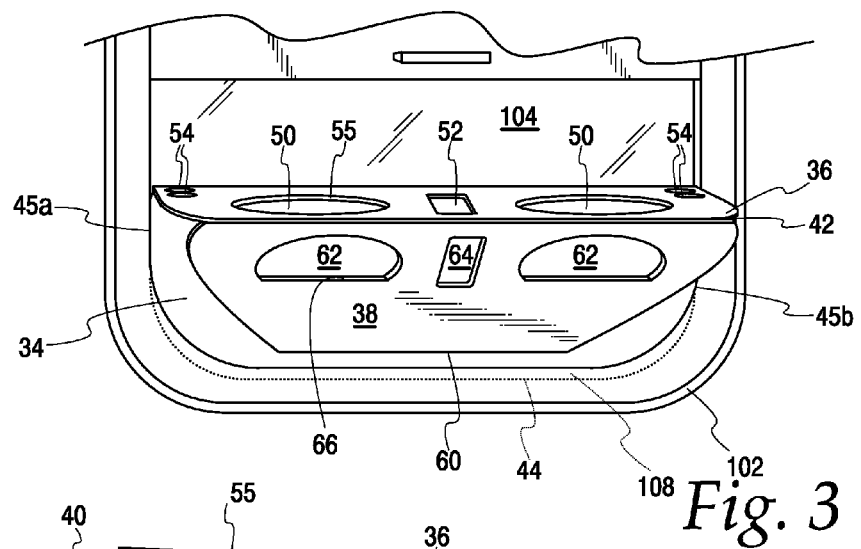
FIG. 3 is a slight perspective view of the blank of FIG. 1, in an assembled condition and supported within the interior framework of an airliner window.
Figure 4:
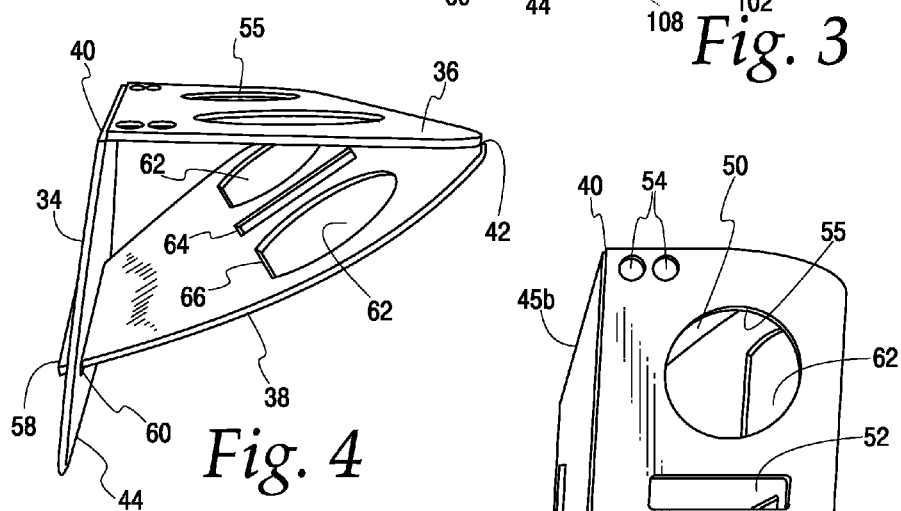
FIG. 4 is a side elevational view, partly in perspective, of the blank of FIG. 1 in an assembled condition illustrating the article-holding openings thereof.

The base panel 34 has a pair of side edges 45a, 45b that are continuous with the bottom edge 44 and which are spaced apart a preselected distance sufficient to fit inside of an airliner cabin window frame 102, as shown in FIG. 3. These base panel edges 44, 45a & 45b will fit into a slot 108 that is disposed in the window frame 102 (FIGS. 13-15) and depending on the location of the slot 108, the base panel 34 may or may not abut the plexiglass window 104 of the airliner.

In order to function effectively as an article organizer and not just merely as a shelf, the blank 32, and specifically the support panel 36 thereof is provided with a plurality of openings 50, 52 and 54. Two circular beverage container openings 50 and one rectangular electronic device opening 52 are illustrated in the embodiment of FIGS. 1-7. The beverage container openings 50 are preferably sized to receive a beverage container, such as a water bottle, can or cup with a little play so that the container may be removed from the organizer as well as inserted into it without difficulty that would lead to spillage. The device opening 52 is shown in the drawings as rectangular in configuration and it is disposed between the beverage container openings 50 and oriented transversely to the width direction of the support panel 36. It is sized to receive a smart phone, PDA (personal digital assistant), iPod or the like. The openings 50 & 52 all have an inner rim 55 that serves to support, in the horizontal direction, an article inserted therein.

Accessory openings 54 may be provided and used for headphones, pens, pencils, connecting cords and the like. These accessory openings 54 may be disposed as in the rear corners of the support panel 36 as shown in FIGS. 1-7 or along the side edges thereof as shown in FIGS. 8-11. It will be understood that some electronic devices, such as smart phones, PDAs, MP3 players or the like, may also be accommodated within the beverage openings.

Figure 5:
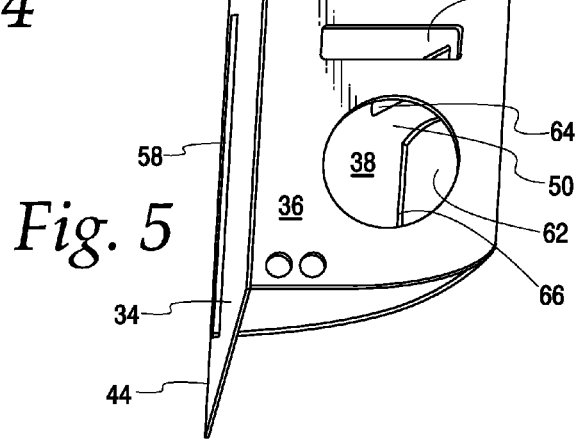
FIG. 5 is a top perspective view of the assembled article organizer of FIG. 4.
Figure 6:
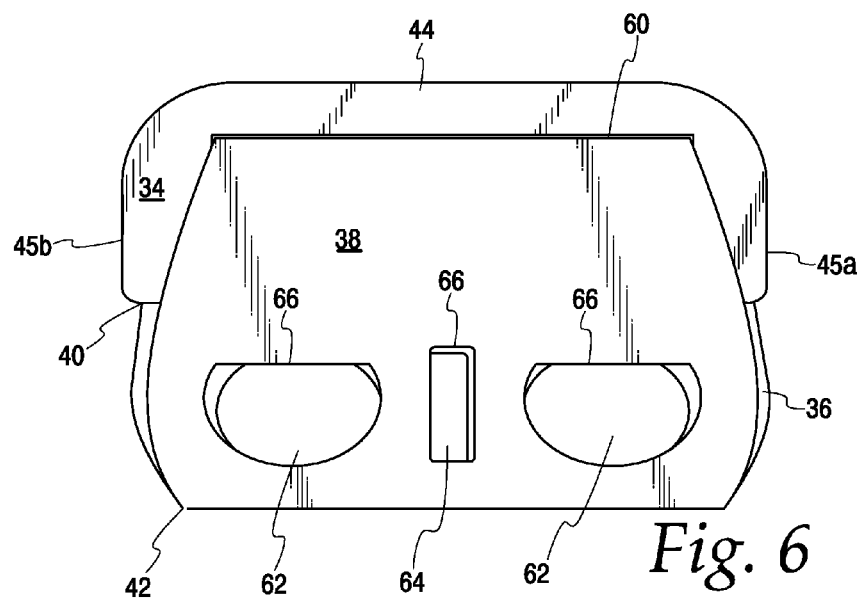
FIG. 6 is a bottom plan view of the article organizer of FIG. 5.
Figure 7:
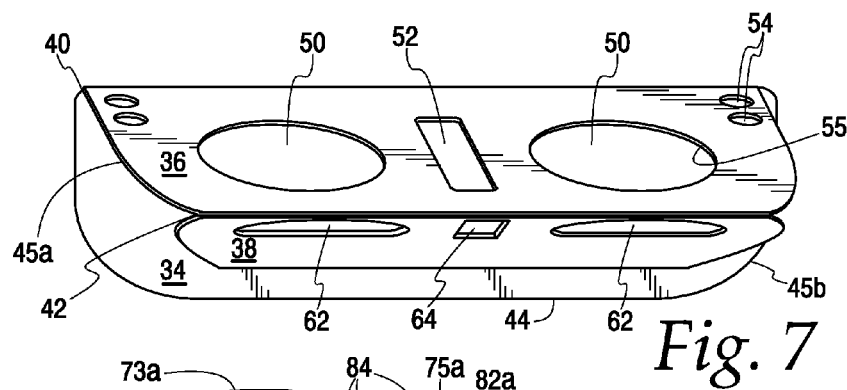
FIG. 7 is front perspective view, taken from above, of the article organizer of FIG. 5.
Figure 8:
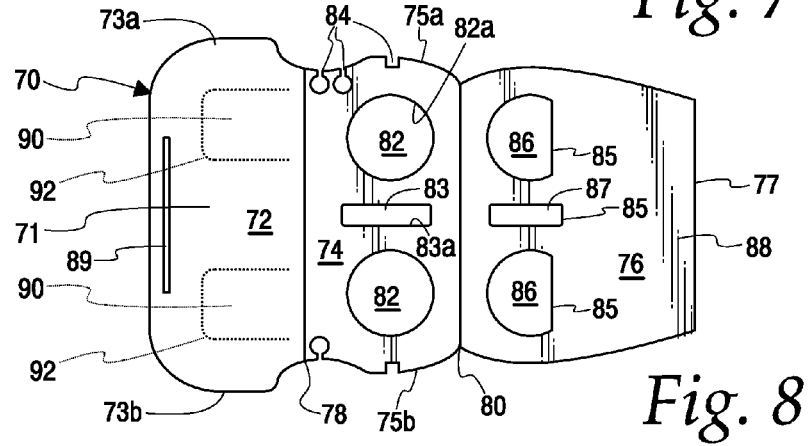
FIG. 8 is top plan view of a blank used in the construction of a second embodiment of an article organizer in accordance with the principles of the present disclosure.

The brace panel 38 includes similar openings such as beverage container openings 62 and a electronic device opening 64. These brace panel openings 62, 64 are preferably disposed in the brace panel 38 so as to align with the support panel openings 50, 52 when the blank is assembled into the organizer 30. The brace panel openings 62, 64 are further different from the support panel openings 50, 52 in that they are at least smaller in area and some of them are different in configuration. (FIGS. 4-6.) The beverage openings 62 are of a different shape than the support panel beverage openings 50 in that they have a truncated circular configuration.

Importantly, each of the brace panel openings 62, 64 have defined thereon, a hard edge 66, disposed underneath the support panel openings 50, 52 that contacts the bottom surface of either the beverage container or the electronic device. This is shown in FIG. 16. The hard edge 66 of each of the openings 62, 64 may be considered as a line that intersects the perimeters of the openings 50, 52 of the support panel 36 if they were to be projected downwardly through brace panel 38. In other words, the hard edges 66 extend transversely with respect to the perimeters of the support panel openings 50, 52 to define a horizontal support that supports an article in the vertical direction. As illustrated in the drawings, the perimeters of the support panel openings provide support in the horizontal direction.

FIGS. 8-11 illustrate a second embodiment of an article organizer 70 constructed in accordance with the principles of the present invention. The organizer 70 is formed from a planar blank 71 that includes three panels, 72, 74 and 76 and which are respectively separated from each other by first and second fold lines 78 and 80. The structure of this organizer 70 is much the same as the organizer 30 of FIGS. 1-7, but for the overall outline thereof. The support panel 74 and brace panel 76 seem narrower in this embodiment as the base panel 72 side edges 73a, 73b extend more outwardly past the side edges 75a, 75b of the support panel 74. This is due to the airliner window slot 108 having a greater side depth at the bottom of the window frame 102, and this configuration facilitates the insertion of the base panel into newer airline cabin window structures.

The three panels 72, 74 & 76 are folded along the first and second fold lines 78, 80 to form a triangular structure as shown in FIG. 9, wherein the support panel 74 extends transversely outwardly with respect to the base panel 72 and the brace panel 76 extends at an angle with respect to both the base panel 72 and the support panel 74. In this manner, the brace panel 76 supports both the support panel 74 and the articles which are inserted into the openings 82, 83 of the support panel 74 by a passenger. The manner of support of articles is shown diagrammatically in FIG. 20, where it can be seen that the inner rims 55 of the support panel openings 50, 52 restrain (and thereby support) an article "A" inserted in the organizer 30. This is shown by the arrows of FIG. 20. The hard edges 66 of the brace panel openings 62 support the article in the vertical direction and restrain it from vertical movement. The hard edge 66 may present either an angled surface that bears against the bottom of the article, resulting in what may be considered as a point contact on the article bottom surfaces, or the hard edge may be inwardly beveled so that it presents a flat surface that bears against the article bottom surface. A clip 66a shown in phantom in FIG. 20 may be utilized to provide a larger support surface. This clip 66a may be integrally formed with the brace panel 38 and bent or folded into a horizontal orientation, or it may be a separate element that clips onto the edge 66.

Additional openings 84 are shown in the form of slots or slotted openings that are disposed along the rear side edges 75a, 75b, of the support panel 74. As demonstrated in FIG. 17, one of these accessory openings 84a is suitable for headphones of connecting cords and the like an includes an opening portion 84c spaced apart from the outer edge of the support panel and a slot portion 84b that extends inwardly to provide a path from the outer edge to the opening portion 84c. This structure permits a user to insert an accessory device, such as a set of headphones, by sliding the wires in along the slot portion 84b and letting the headphone or connector end rest on the support panel.

As with the previous embodiment, the brace panel 76 defines a free end 77 of the organizer that takes the form of an engagement tab 88 that is received within a slot 89 formed in the base panel 72 proximate the lower edge thereof. Alternate means of engagement may be used such as a stop member, or bar, that is formed on the front surface 73 of the base panel 72 or, as illustrated in FIG. 21, a raised bar, or ridge 142, may be formed on the base panel 72 and extend thereon for a preselected horizontal extent. The bar, or ridge 142, preferably includes a groove, or channel 144, formed therein which is configured to receive an opposing and interengaging tongue portion 146 that is formed at the free end 77 of the brace panel 76. Although illustrated as a tongue and groove engagement in FIG. 21, it is also contemplated that the engagement tab 88 may engage the bar in other manners, such as frictionally, adhesively and the like.

FIGS. 13-15 illustrate the manner in which the organizers of the present disclosure may be assembled and used in transit by a passenger flying in an airline cabin 100. Initially, the passenger unfolds the brace panel 76 along the second fold line 80 to expand the blank 71 and then folds the base panel 72 downwardly along the first fold line 78 so that the support panel 74 extends outwardly. The brace panel engagement tab 88 is placed into the base panel slot 89 to form the triangular organizer 70. Once formed, the passenger inserts one of the base panel side edges 73b into the window frame slot 108 as shown in FIG. 14. Then, as illustrated in FIG. 15, the organizer 70 is rotated counter-clockwise so that the base panel other side edge 73a and its bottom edge engage the window frame 102, mostly by way of the window frame slot 108. Preferably, the slot 108 is spaced-apart from the window 104 so that the passenger may operate the window shade 106 without interference.

Once the article carrier is installed, the brace panel openings 86, 87 are aligned with the support panel openings 82, 83, as noted above. so that they will receive portions of any articles such as beverage containers or electronic devices therein and the bottom edges 85 of the brace panel openings 86, 87 will engage the bottom surfaces of the articles. This is illustrated best in FIG. 16 where one (on the left) support panel beverage opening 82 receives a water bottle 95 therein, the other (on the right) support panel beverage opening 82 receives a beverage can 96 and the support panel electronic device opening 83 receives a smart phone 97 therein. The openings may be of different sizes such that one can accommodate bottles and the other cans, as illustrated in FIG. 6. Headphones 98 and a connector cord 99 are held in the accessory openings 84.

It can be seen how the bottom edges 85 of the brace panel 76 abut against the bottom surfaces 95a, 96a, & 97a of the articles 95-97. Whereas the bottom edges 85 of the brace panel 76 support the articles in the vertical direction (and restrain downward vertical movement thereof), the interior rims, or edges 82a, 83a of the support panel openings 82, 83 support the articles in the horizontal direction (and restrain horizontal movement thereof). In this manner, the bottom edge 85 of the brace panel can support smaller items in the larger openings, such as a smart phone in a beverage opening.

Figure 18:
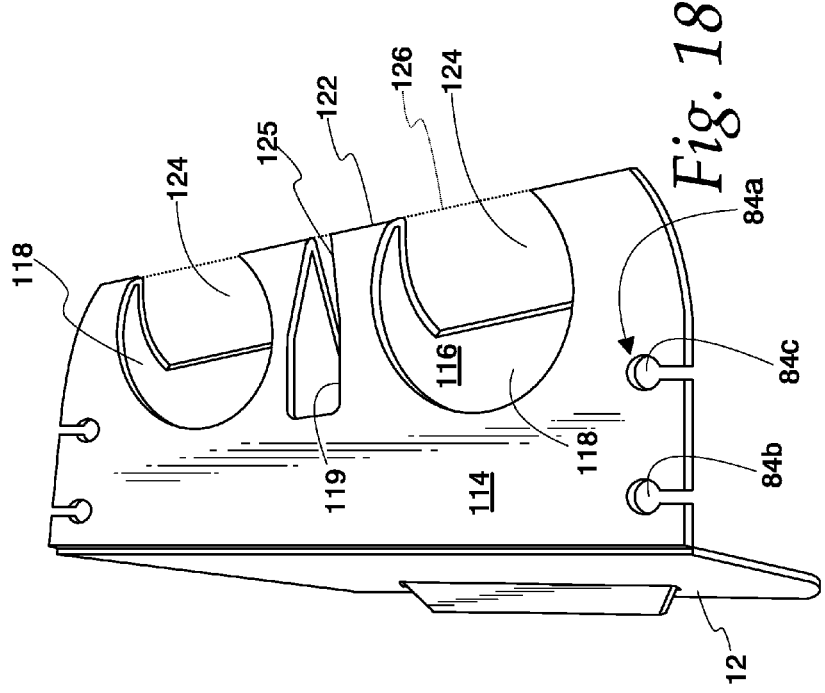
FIG. 18 is a perspective view, taken from above and from one side thereof, of the blank of FIG. 18 in an assembled condition.

FIGS. 17-18 illustrate yet another embodiment of an article organizer 110 constructed in accordance with the principles of the present disclosure. The organizer 110 has three interconnected panels: a base panel 112 for attachment to the airline cabin window, a support panel 114 that extends horizontally relative to the base panel 112, and a brace panel 116 that interconnects the base and support panels 112, 114 at the front of the organizer 110. The support panel 114 includes beverage and device openings 118, 119 and the brace panel 116 also includes a like number of openings 124, 125. In this embodiment, the support panel article-receiving openings 118, 119 intersect with the front, or leading edge 122, of the support panel 114, as do the brace panel article-supporting openings 124, 125. These two sets of openings 118, 119 and 124, 125 intersect at what are referred to herein as "phantom edges" (shown as 126 as a dashed line in FIG. 18) that are aligned with the front edge 122 of the support panel 114 so that the leading edge 122 is discontinuous. The effect of this is that the support panel openings 118, 119 are themselves truncated at their forward ends and the brace panel openings 124, 125 are truncated at their upper ends, as well as at the lower ends where the support edges 127 are defined that contact the bottom surfaces of the articles carried by the organizer 110. This construction saves on space as the support panel 114 is narrower in the horizontal depth direction. It is desirable to have more than about 190 degrees of the circular openings 118 in order to provide the desired support and restraint horizontally and without being large enough for the beverages or devices to slip out of the openings. In effect, it is desirable for the opposing ends of the truncated openings to extend, or pinch inwardly as illustrated.

In FIGS. 8-12, an alternate means of mounting the article organizer 70 is illustrated which is particularly suitable for use by an airline passenger in a non-window seat. A plurality of engagement members, are shown in phantom in these Figures as tabs 90 which are defined by U-shaped slots, or cuts, 92 formed in the base panel 72. These 92 slots permit the engagement tabs 90 to be bent slightly out of the plane of the base panel 72 so that they can slip over the edge of the seat pocket confronting the passenger. In FIG. 9, the tabs 90 would be pushed out to the left and they could slipped over the top edge of the tray table in the seat in front of the passenger and in an upright position. The tabs 90 would fit in the space between the tray table and the pocket of the seat in which the tray table resides. As such, the tabs 90 may be considered as a clip-type structure. In this regard, the tabs 90 may be slightly bent at an angle to define a U-shaped clip that faces downwardly for engagement with the top edge of the tray table, for example. As noted below, structures other than the tabs 90 illustrated may be used as engagement members.

Figure 19:
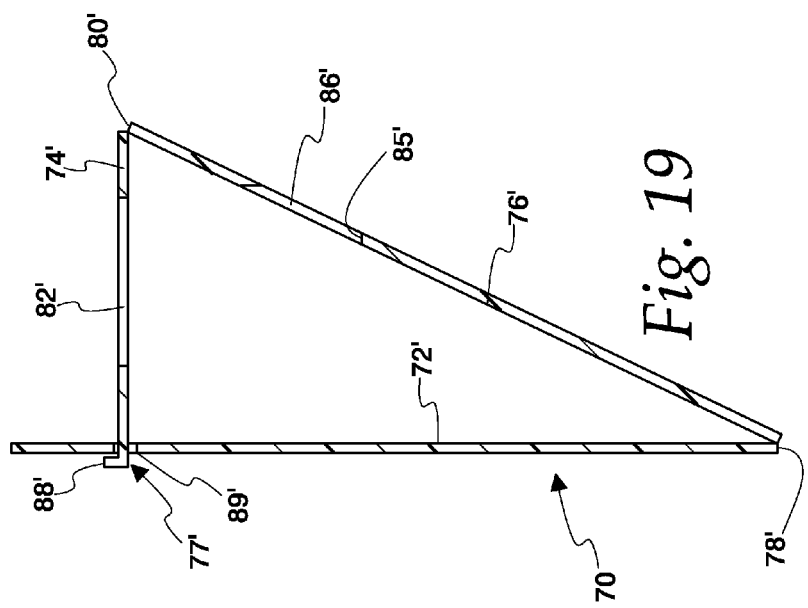
FIG. 19 is a sectional view of a fourth embodiment of an article organizer constructed in accordance with the principles of the present invention and in which the support panel engages the base panel.

FIGS. 19 and 22 illustrate an organizer 70' utilizing an alternate structure for interconnecting together the three panels 72', 74' & 76'. In this embodiment, the base panel 72' is not hingedly connected to the support panel 74' along a first fold line 78', but rather is hingedly connected to the brace panel 76' along the first fold line 78', while the second fold line 80' and its hinged connection remains in place interconnecting the support panel 74' to the brace panel 76'. In this manner, the overall triangular configuration of the organizer 70' is maintained, but the engagement that completes the structure is now located at the upper portion of the base panel 72' rather than at the bottom portion as shown in the embodiments described above. The support panel 74' includes a free end 77' that terminates in an engagement tab 88' with an upturned flange (FIG. 19) that extends through the base panel engagement slot 89' and which bears against the back surface of the base panel 72'.

As noted above, and as illustrated in FIG. 23, an organizer 150 with a base panel 151, support panel 152 and brace panel 153 may have the free end of the brace panel 153 configured to define a plurality of engagement tabs 154 which are spaced apart from each along the free end, These tabs 154 are received within a like number of engagement slots which are formed in the base panel 151 and disposed proximate a bottom edge thereof. Likewise, it is contemplated that the brace panel 153 may be provided with engagement slots and the base panel 151 be provided with engagement tabs that interengage to support the organizer in its operating condition.

FIG. 20 further illustrates an alternate manner of engagement between the organizer and the airline cabin window 104 that may be utilized to engage the organizer 30 with the airline cabin window 104. One or more suction cups 125 may be mounted to the back surface of the base panel 34 at a location preferably from midway to proximate the top edge of the base panel 34 in order to prevent an excessive tipping moment from occurring when the organizer is filled with articles.

Figure 24:
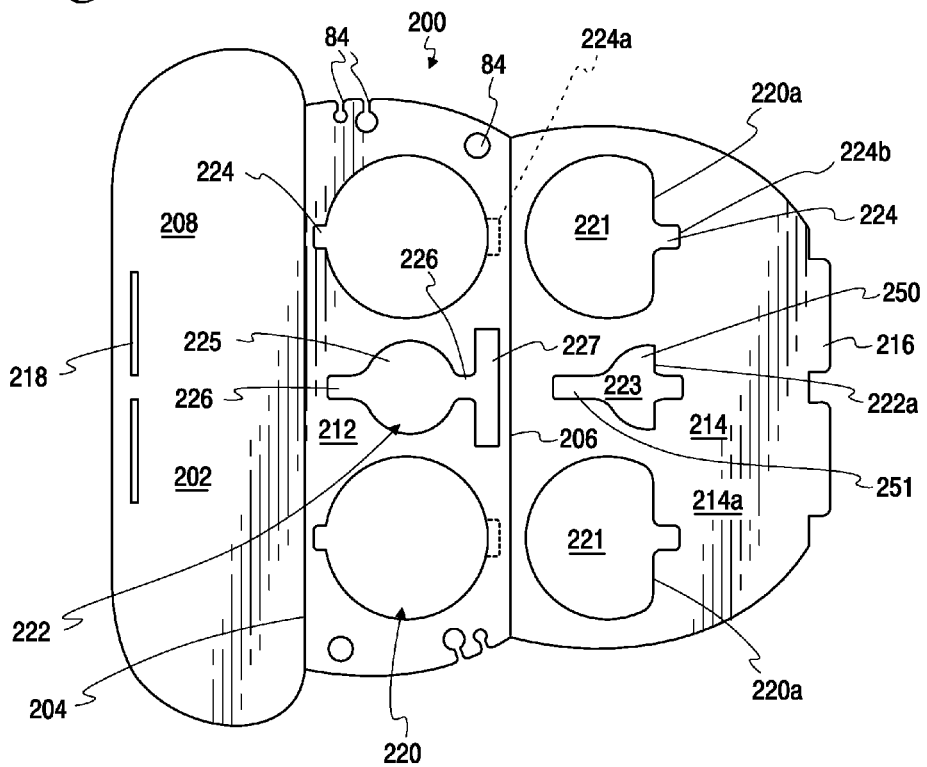
FIG. 24 is a top plan view of another embodiment of an article organizer in accordance with the present disclosure and which includes multi-functional slots shown formed in the support and brace panels of the organizer.
Figure 24A:
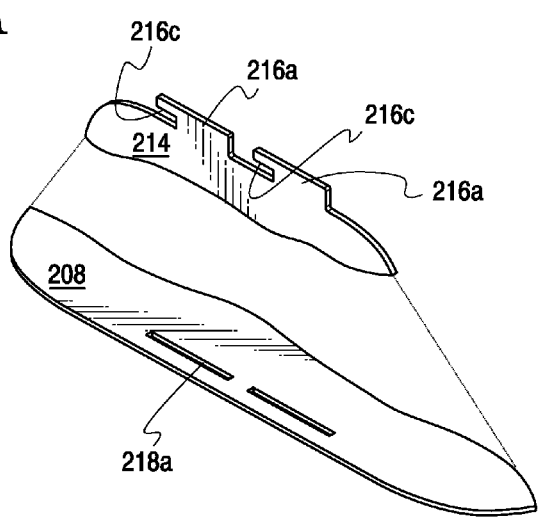
FIG. 24A is a broken perspective view of an article organizer of the present disclosure with an alternate engagement structure between the base and brace panels.
Figure 25:
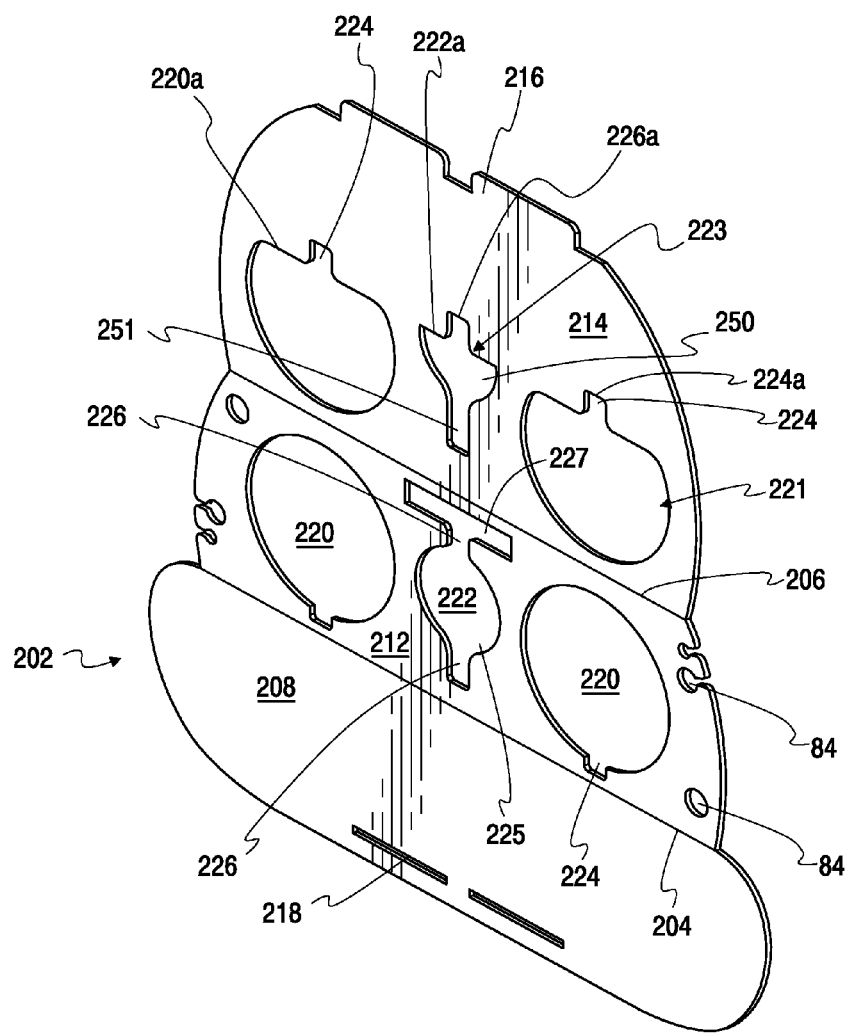
FIG. 25 is a perspective view of the article organizer of FIG. 24 shown in a flat, unassembled condition.

FIGS. 24-26B illustrate another embodiment of an article organizer 200 that is formed from a blank 202 of durable material that is flexible enough so that it can be folded upon itself along two fold lines 204, 206 into a triangular-shaped structure. The organizer 200 that has a base panel 208 for engaging an airliner window 210, a support panel 212 for supporting various articles and a brace panel 214 with engagement members in the form of tabs 216 which are received within corresponding slots 218 formed in the base panel 208. The brace panel 214 engages the base panel 208 to hold the support panel 212 up in a horizontal orientation as displayed on the previous embodiments discussed above. FIG. 24A illustrates an alternate style of brace panel engagement tabs 216a that extend widthwise of the panel 214 so as to define free ends 216b of the engagements tabs 216a that are separated from an edge of the panel 214 by intervening notches 216c. The engagement slots 218a of this embodiment may be arranged slightly to the side of the center of the base panel 208 so that when the tabs 216a are inserted, they return to a centered orientation.

In this embodiment, each of the article receiving openings 220, 222 disposed in the support panel 212 are illustrated as being configured to receive at least two articles of different configuration articles therein, rather than just a single configuration article. In this regard, the circular openings 220 which engagingly support drinks, large bottles and cans in the previous embodiments, have a rectangular or square (the meaning of those two terms in this embodiment being synonymous) slot 224 added to them so that they can now engagingly support a smart phone or PDA in the formerly completely circular slot. The slots 224 may be disposed at the rear of the openings 220 as illustrated in FIG. 24, or they may be disposed at the front ends as shown in phantom at 224a, also in FIG. 24. In this manner, the outer article-receiving openings 220 can accommodate and engage a cylindrical article, such as a can, glass or bottle as well as a smart phone or PDA. In the case of the latter article, it may be placed in the article-receiving opening so that a bottom edge thereof rests on the hard edge 224a of the article-support opening 221 disposed beneath it in the brace panel 214. In this manner the different articles are engaged and prevented from side-to-side movement which would occur in carriers that use square containers to support articles.

The center opening 222 in this embodiment takes a configuration that is similar to an hourglass with a central circular opening 225 having a linear bisector slot 226 that extends through the circular opening 222 and an accessory slot 227 that intersects the bisector slot 226 and extends at an angle thereto. As noted above, additional article-supporting openings 221, 223 are disposed in the brace panel 212 below the article-receiving openings and are preferably aligned with the article-receiving openings 220, 222 and provide a supporting edge 220a, 222a for each such opening 220, 220 as illustrated and described in the previous embodiments herein.

Figure 26A:
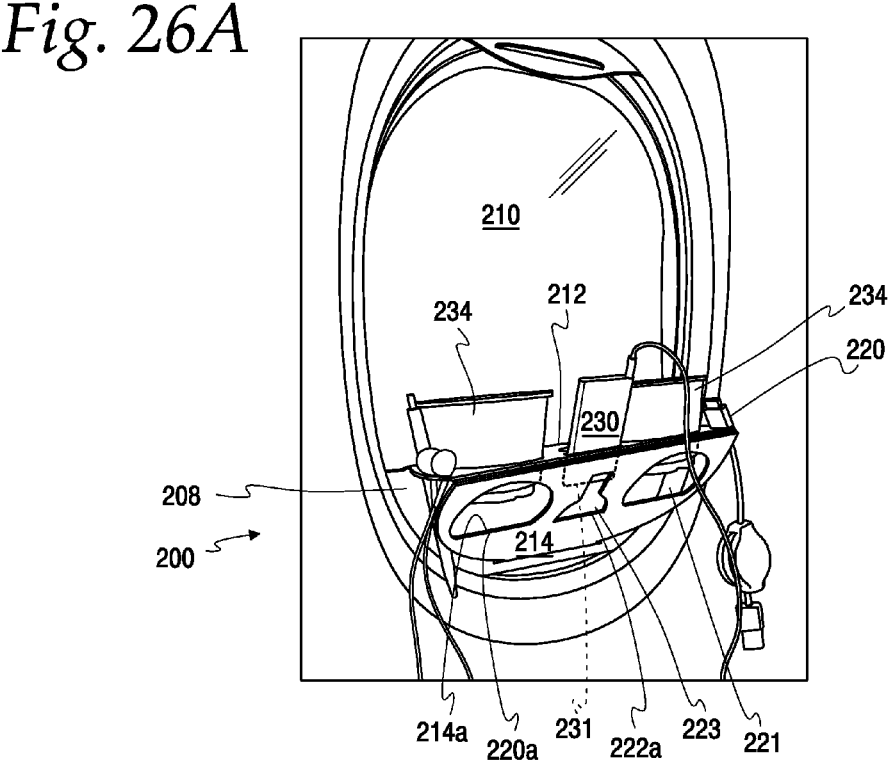
FIG. 26A is a perspective view of the article organizer of FIG. 24 in place in an airliner window and full of organizers and with the center article opening supporting device such as an Ipod or MP3 player.
Figure 26B:
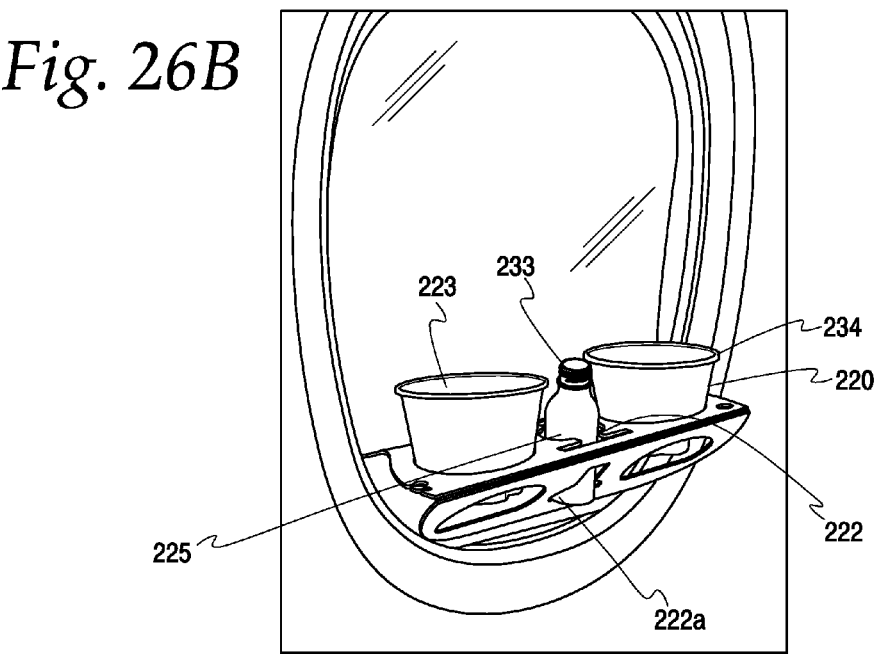
FIG. 26B is a similar view to FIG. 26A, but with an airline spirits bottle supported in the center article opening.
Figure 26C:
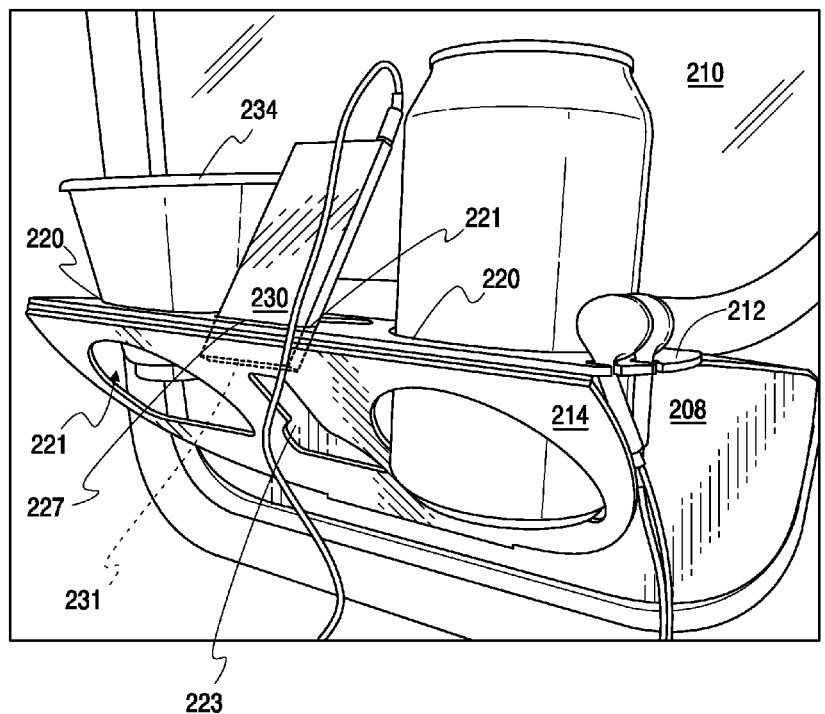
FIG. 26C is a perspective view of the article organizer of FIG. 24, illustrating the manner in which a music player may be held in the central article-receiving opening.

In this embodiment, the need for a lower supporting edge is dispensed with for articles of certain sizes and configurations. For example, and as illustrated in FIGS. 26A and 26C, the accessory slot 227 accommodates a personal music player 230 of an iPod or MP3 player type. The user can either tilt the music player 230 toward the brace panel 214 so that the bottom thereof engages an interior surface 214a of the brace panel 214. The accessory slot 227 is also preferably positioned on the support panel 212 so that if the device 230 is inserted vertically straight in the slot 227 the bottom of the device contact the brace panel interior surface 214a. In this manner, the brace panel interior surfaces will reliably contact the bottom 231 of the device 230 and support it rather than a edge of one of the article-supporting openings. Similarly, and as illustrated in FIGS. 26A-B, the drink glasses 234 supported in the support openings 220 have tapering diameters so that they will engage the inner rims of their corresponding article-receiving openings 220.

The circular center opening 222 is also sized to accommodate either an airline spirits bottle 233 or a TSA security clearance size bottle by virtue of its circular configuration. Such small diameter bottles would fall off their corresponding supports edges 231 of the larger openings 220 because they would only sparsely make supporting contact with the rims of their associated article-receiving openings 220. As such, the bottles would not be horizontally retained by the inner rims of the article-receiving openings 220, 222. With the center openings sized properly to accept these smaller sizes, the bottles 233 supported therein make contact with the corresponding support edges 222a of the article-supporting openings beneath them, and the reduced diameter of the openings 222 prevents the bottles from wavering within the openings 222. The article supporting opening 223 beneath the center article-receiving opening 222 also has an irregular configuration in the manner of the opening 222. It has a somewhat semi-circular portion 250 that is bisected by a rectangular portion 251 that extends through both ends of the center portion 250. Hard support edges 222a and 226a are provided with respect to the center portion 250 and the rectangular portions 251 and these edges support articles supported in the center semi-circular portions 250 and the rectangular portions 251.

The center support opening 222 also includes a bisecting slot 226 that, due to its orientation, can accommodate a smart phone or PDA or similarly sized and configured device therein. With the multi-functional center slot, the article organizer 200 can accommodate more than just three different items as well as differently sized items within individual openings. This is useful where a passenger has two smart phones or digital assistants, where one of those two items can be supported in the middle opening and the other of the two can be supported in one of the end openings.

Figure 27:
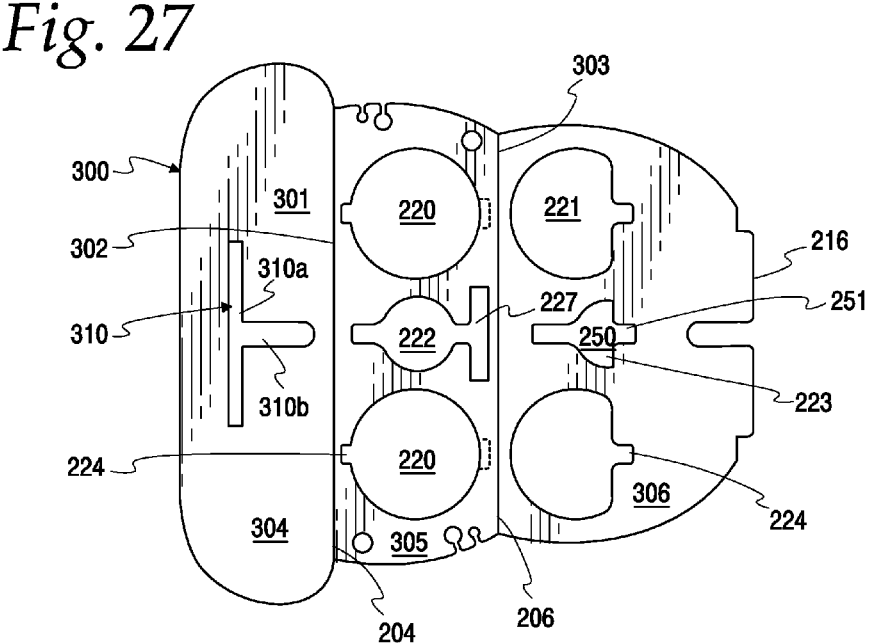
FIG. 27 is a top plan view of another embodiment of an article organizer in accordance with the principles of the present disclosure, and having an attachment slot formed in its base panel which permits attachment of the article organizer onto a seat tray table retention latch, while the tray table is in an up position.
Figure 28:
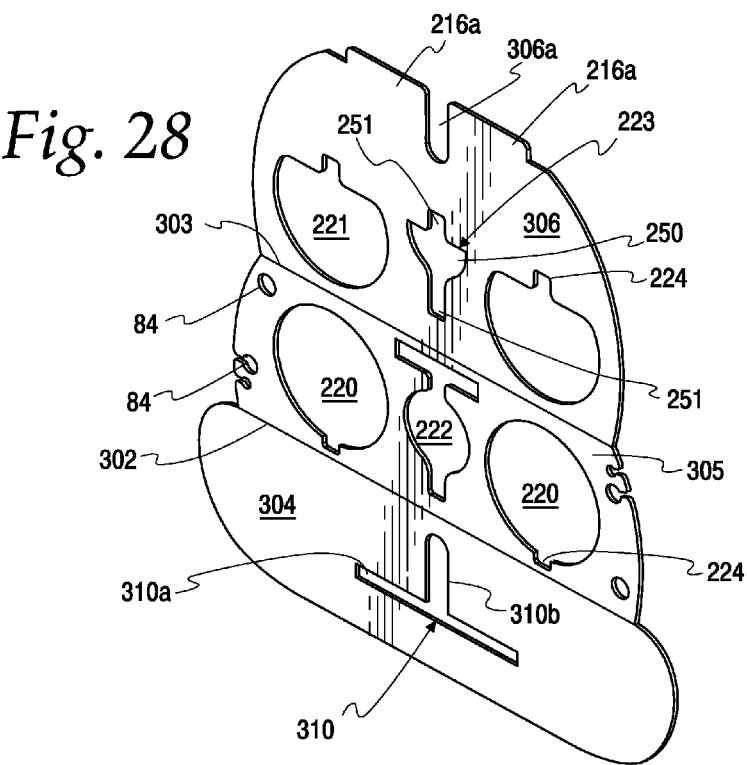
FIG. 28 is a perspective view of the article organizer of FIG. 27, in a flat, unassembled condition.
Figure 31:
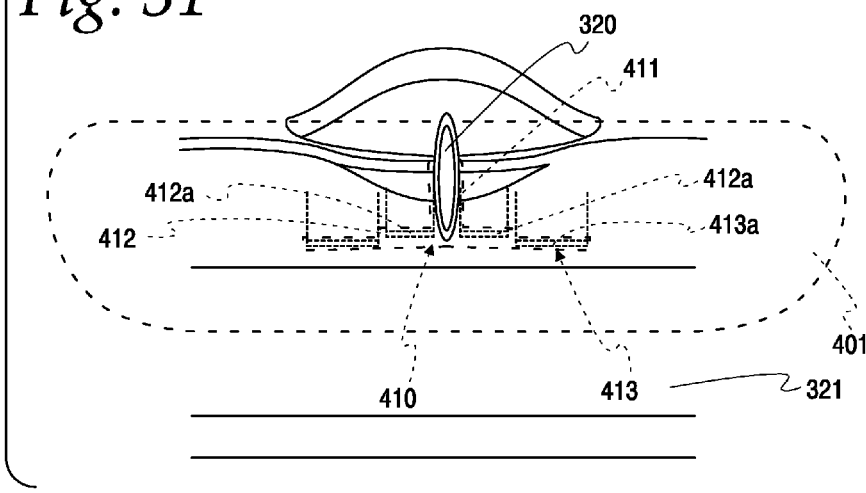
FIG. 31 is an elevational view of the rear of an airline passenger seat illustrating the tray table latch and the base panel of the article organizer of FIG. 29 in place thereon.

FIGS. 27-28 illustrate another embodiment 300 of an article organizer of the present disclosure which is formed from a flat blank 301 of durable material and assembled together along fold lines 302, 303 to form a triangular configuration, but which is structured to attach to a passenger seat of an airliner. The blank 301 includes a base panel 304, a support panel 305 and a brace panel 306. The article-receiving openings 220, 221 are the same as described above, as are the article-supporting openings 221 and 223. In a unique aspect of this embodiment, the base panel 304 is provided with an engagement opening formed therein that takes the form of a generally T-shaped slot 310. This engagement slot 310 is configured to fit over an airline passenger seat tray table latch 320, whether the tray is in its upright, stored position as illustrated in FIG. 31, or unlatched and in its down, operational position. The slot 310 permits the passenger to attach it to the passenger seat in front of him in contact with the tray table in the first instance. If the passenger wants to lower the tray table and utilize that, he can still fit the slot 310 over the tray table seat latch so that the article organizer 300 is positioned in front of the passenger.

Figure 32:
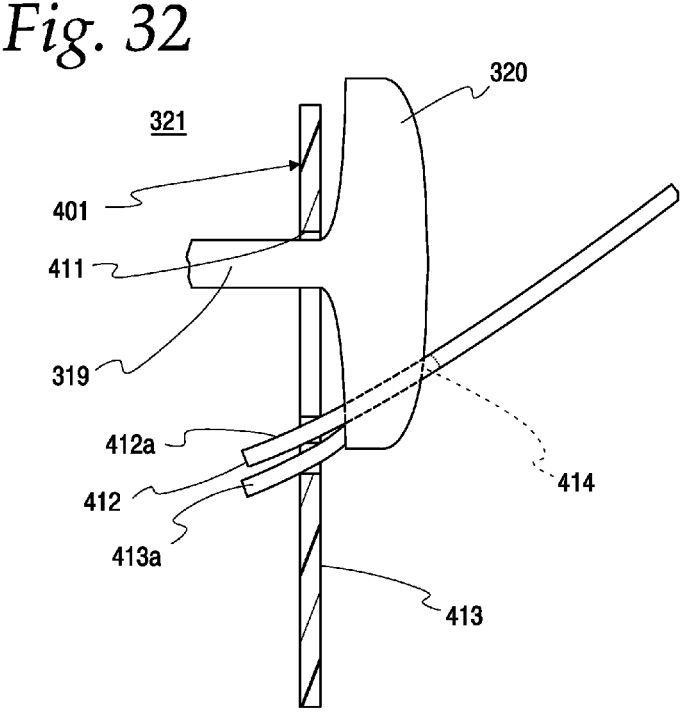
FIG. 32 is a diagrammatic view illustrating the interengagement of the slots and tabs of the article organizer of FIG. 29 and the tray table latch.

As illustrated, the engagement slot 310, is T-shaped and has two distinct portions 310a, 310b that extend at an angle to each other and which cooperate to permit the base panel 301 to be flexed and fit over the tray table latch 320 (FIGS. 31 & 32) and engage the post, or pin, 319 on which the tray table latch 320 pivots. When engaged, the rear surface of the base panel 304 will confront and may abuttingly engage the tray table 321 when it is in an upright position, while the front surface of the base panel 301 will bear against the wing portions of the tray table latch member 320. The top of the attachment slot 310 receives the pivot post that attaches the tray table latch member 320 to the body of the passenger seat. The horizontal portions 310a of the slot 310 may be configured to receive the engagement tabs 216a formed at the end of the brace panel 306. The brace panel 306 also includes its own engagement slot 306a that accommodates the tray table latch post. The wing portions on the tray table latch 320 abut portions of the brace panel 306 surrounding the slot 306a and hold it and the portion of the base panel 304 underneath it against the tray table 321

Figure 29:
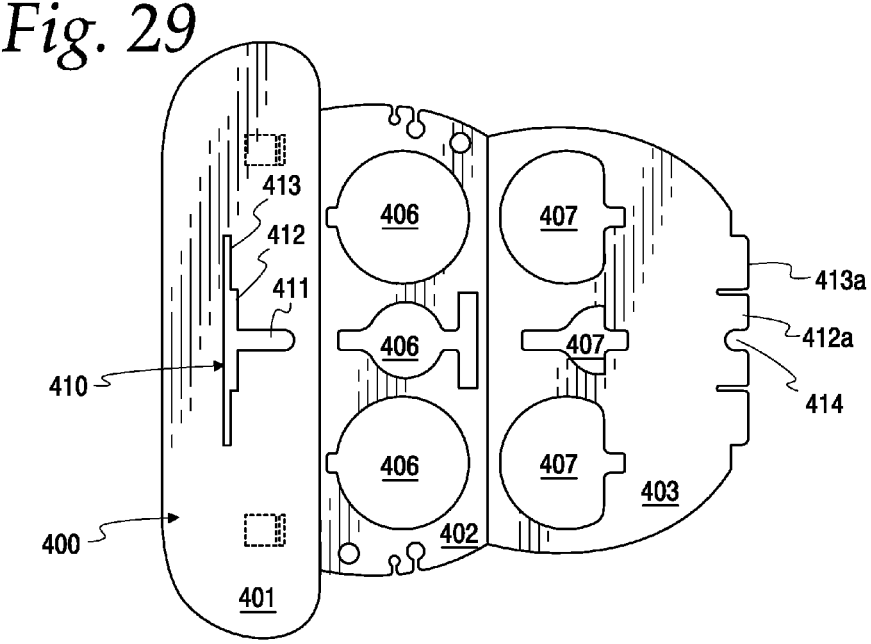
FIG. 29 is a top plan view on another embodiment of an article organizer constructed in accordance with the principles of the present invention that incorporates a tray table engagement structure.
Figure 30:
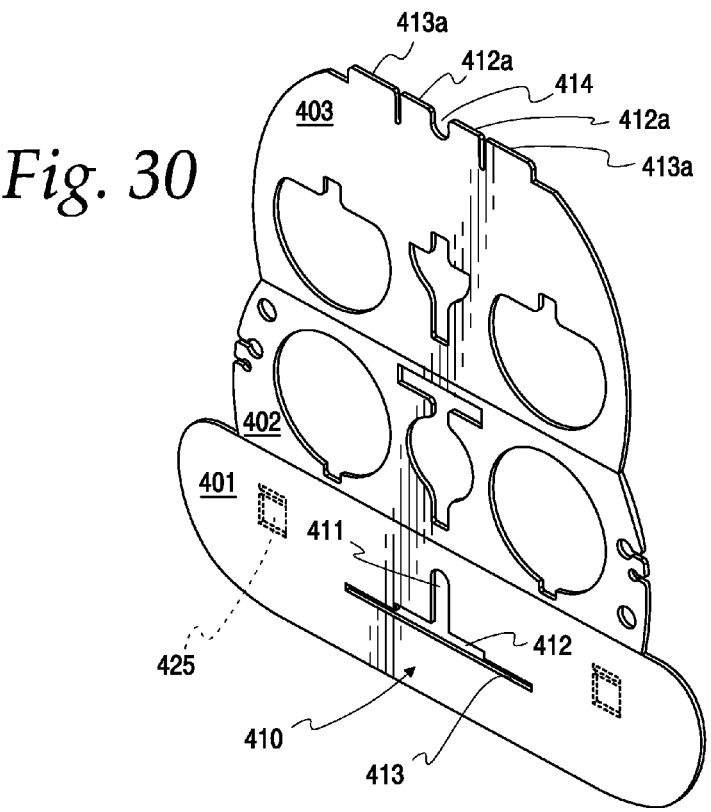
FIG. 30 is a perspective view of the article organizer of FIG. 19.

FIGS. 29-31 illustrate an article organizer with another alternate means of engagement with the tray table latch. The organizer 400 has a folded three panel structure of a base panel 401, a support panel 402 and a brace panel 403. It has article-receiving openings 406 in the support panel 402 and article-supporting openings 407 in the brace panel 403. For attachment purposes, the base panel 401 includes another T-shaped engagement slot 410 that has a vertical slot portion 411 and two horizontal base slot portions 412 and 413. The base panel slot 410 fits over a tray table latch member 320 as illustrated in phantom in FIG. 31. The T-shaped configuration allows flexing of portions of the base panel to permit a user to snap it or rotate it into place over the tray table latch member 320 so that it engages the pivot pin 319 to which the tray table latch member 320 is mounted.

In this embodiment, the outermost engagement tabs 413a of the brace panel 403 are accommodated in the outermost slots 413, while the brace panel innermost engagement tabs 412a are accommodated in the base panel innermost slots 412. The brace panel 403, as illustrated, includes an attachment slot 414 disposed in an end thereof and bounded within the innermost engagement tabs 412a. This slot 414 receives a portion of the tray table latch member 320 therein so that the brace panel innermost and outermost engagement tabs 412a, 413a are free to move without interference from the tray table latch member 320 and they can enter their corresponding base panel slots 412, 413 as shown diagrammatically in FIG. 32 and they may then contact the bottom edge of the base panel slot 413. This provides a reliable attachment to the tray table latch member 320. The innermost tabs 412a may be able to be bent to engage the tray table latch member 320 in other ways such as between it and the base panel.

Figure 37:
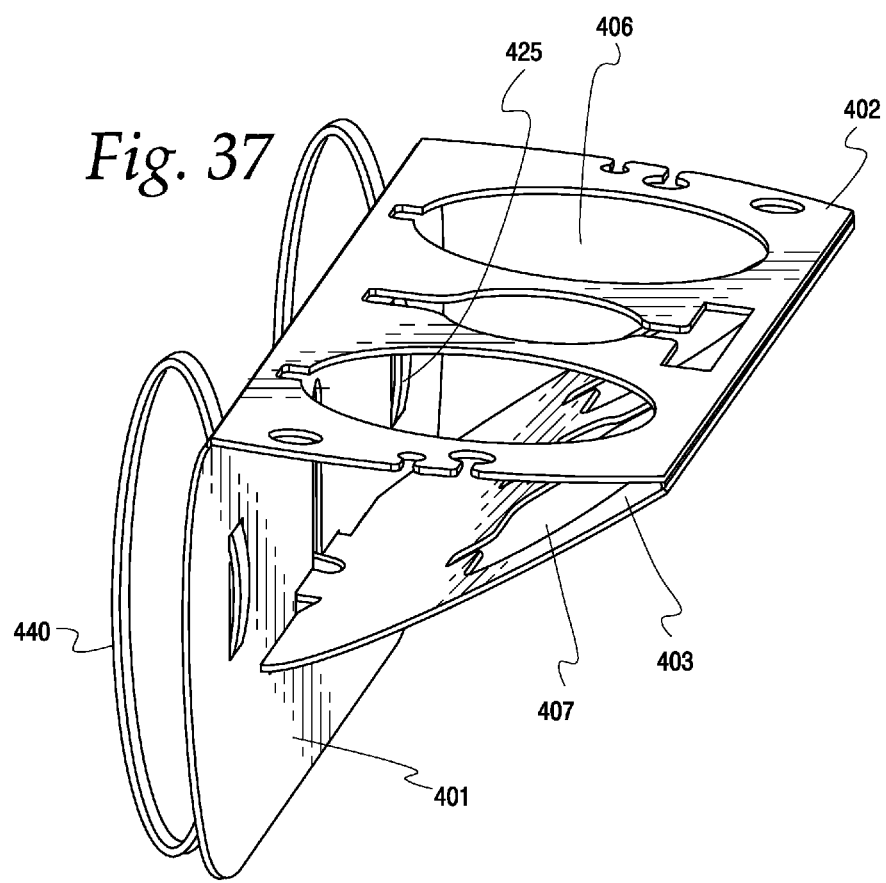

Additional openings 425 may be provided that engage clips or the like, either formed as part of the base panel 401 or attached thereto as separate members. These attachment members may take the form of clips or hooks or may even support straps having fabric loops connected to base panel 401 at the openings 425, or rubber bands that are threaded through the openings 425. The straps that are threaded through the opening 425 can be passed around the tray table to additionally secure the base panel to the tray table. As shown more clearly in FIG. 37, the openings 425 in the base panel 401 permit straps to be threaded therethrough to form loops that can encircle the tray table of a passenger seat.

Figure 33:
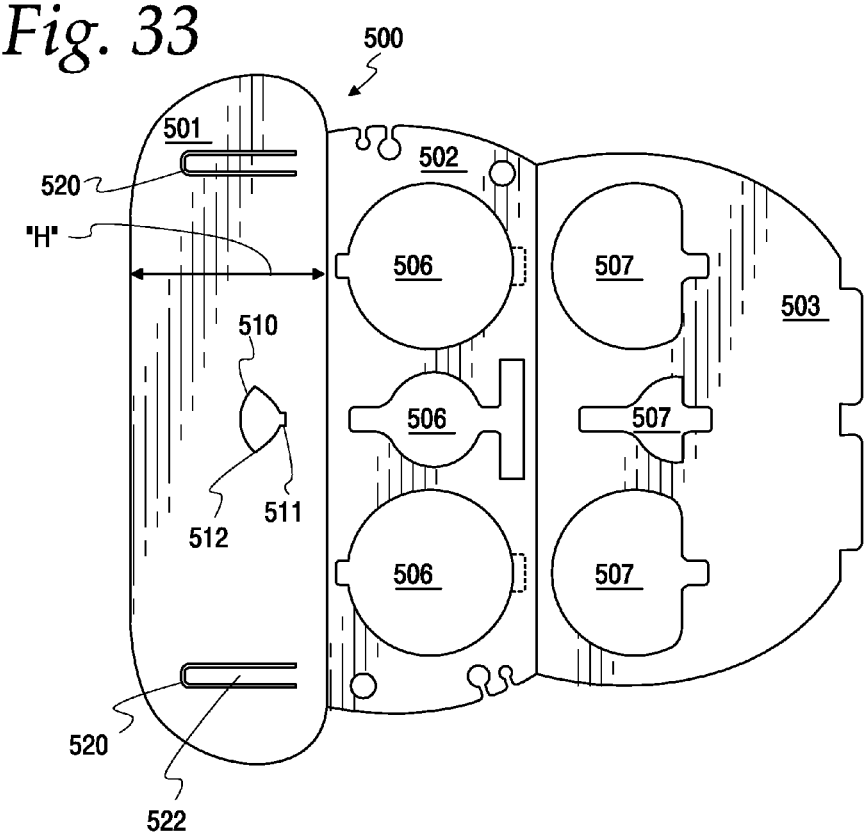
FIG. 33 is a plan view of another embodiment of an article organizer configured to attach to either an airliner window, or to a passenger seat tray table.

FIGS. 33-37 illustrate other embodiments and FIG. 33 illustrates an article organizer 500 constructed in accordance with the principles of the present disclosure. The organizer 500 is illustrated in plan view and has a base panel 501, a support panel 502 and a brace panel 503 which are hingedly interconnected so that they may be folded upon themselves to lie substantially flat for storage and/or transport. The panels have openings 506, 507 that are aligned with each other in the manner described above so that a passenger may place articles in the openings so they are supported. In this embodiment, the base panel 501 has a passenger seat tray table engagement opening 510 that has a flying saucer configuration with a small notch portion 511 for receiving the tray table latch post 319 (FIG. 34) at its top and a larger skirt portion 512 for engaging the tray table latch 320. This configuration permits the user to slip the base panel 501 over the tray table latch 320 and the length of the opening L is preferably less that the radius R of the latch post 319 to the far end of the tray table latch 320 so that the wing portions of the latch 320 do not fall through the engagement opening 510.

Figure 34:
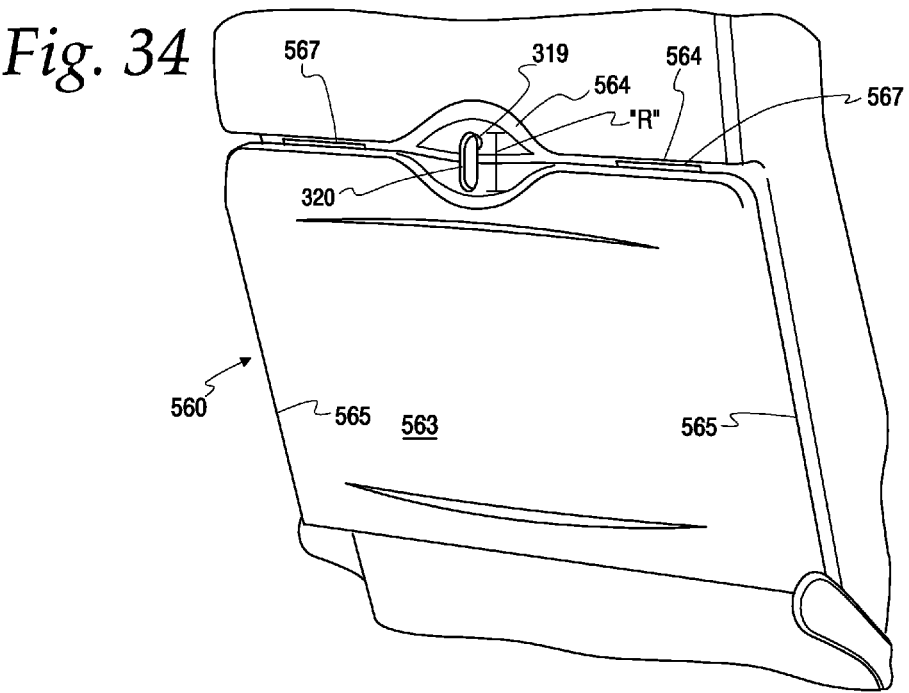
FIG. 34 is a partial view of a passenger seat and a tray table mounted thereon in an upright position.

The base panel 501 in this embodiment, similar to the embodiment of FIGS. 9-12, contains a plurality of U-shaped slots 520 formed therein that define corresponding, elongated engagement tabs members. These engagement members are illustrated as having the form of tabs 522 that extend generally vertically within the base panel 501 and can be moved outwardly from the plane of the base panel 501 and, as such, may be considered as movably mounted to the base panel 501. When moved away from the base panel 501, each tab 522, in cooperation with the base panel, forms a space in the form of a slot, or channel, 524 that receives a corresponding edge of the passenger seat tray table, and preferably the top edge thereof. As shown in FIG. 34, an airline passenger seat 560 includes a base portion 561 that has a cavity 562 therein in which the tray table 563 fits. The seat 560 has a latch block 564, or other similar member that pivotally supports a tray table latch 320 that rotates about a post 319 fixed to the block 564.

Figure 35A:
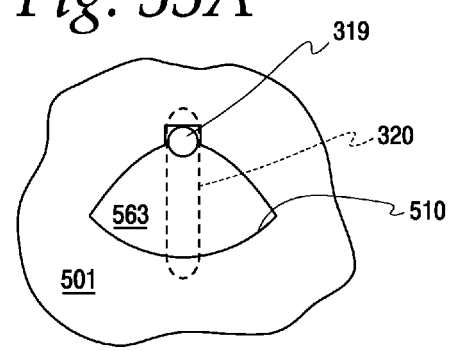
FIG. 35A in an enlarged detail view of the manner in which a base panel of an orgnaizer of the present disclosure engages a passenger seat tray table latch.
Figure 35B:
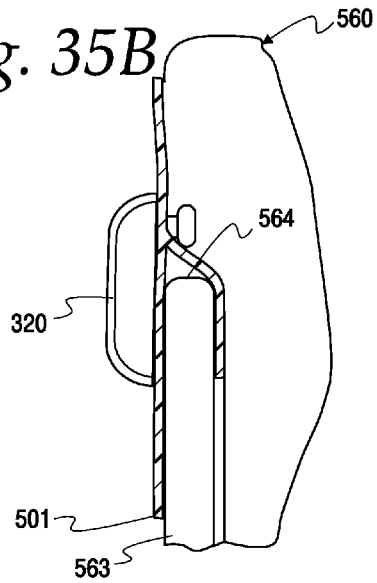
FIG. 35B is a partial sectional view of the passenger seat-tray table assembly of FIG. 34 at the latch portion thereof showing how the article organizer base panel and tab members cooperatively engage the tray table.

The tab 522 fits into the space between the tray table 563 and the passenger seat 560 as shown in FIG. 35B. The tabs 522 and the engagement openings 510 of the base panels 501 of this and other embodiments will cooperate to hold the organizer in place against the passenger seat tray table 563. It is preferred that the tabs 522 have a length of between at least about one-half to about three-fourths of the height H of the base panel 501.

Figure 35C:
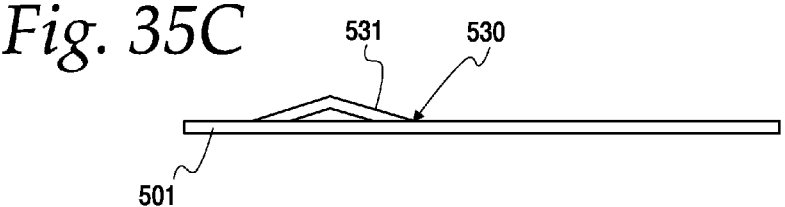
FIG. 35C is an end view of an alternate engagement member that has an angled portion.
Figure 35D:
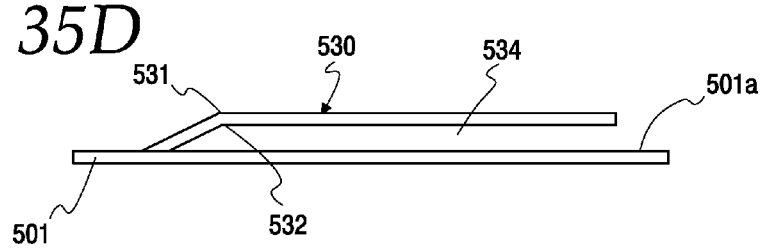
FIG. 35D is the same view as FIG. 35C, but with the engagement member moved away from the base panel to define a channel, or slot, into which a tray table edge may be inserted.
Figure 35E:
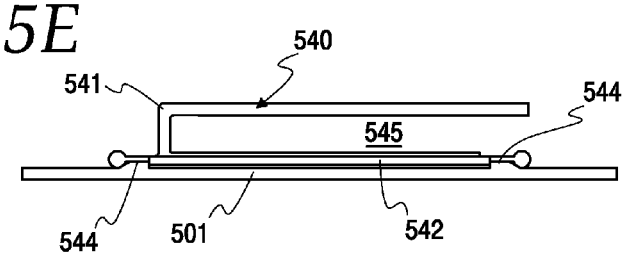

The tabs 522 may be formed flat and lie in the same plane as the base panel 501. Or, as illustrated in FIG. 35C, the tabs 530 may have a slightly non-planar configuration, such as one with an angled portion 531 that extends away from the plane of the base panel 501 in sort of a tent-like configuration so that an interior angle 532 is formed. When the tab 530 is pressed away from the base panel 501 as illustrated in FIG. 35D, an engagement slot 534 is defined between the tab 530 and a confronting surface 501a of the base panel 501. In another embodiment, the engagement members 540 may be formed separately from the base panel and affixed thereto. FIG. 35E illustrates an engagement hook member 541 that has a mounting post 542 or the like that is movably received within journals, or notches, 544 that disposed on the base panel 501. These type of engagement members can be rotated down against the base panel 501 for storage and carrying purposes and subsequently rotated away from the base panel 501 so as to orient its engagement slot 545 defined in the hook member 541 itself so that the base panel 501 may be slipped over a top edge 564 of the tray table 563.

Figure 35F:
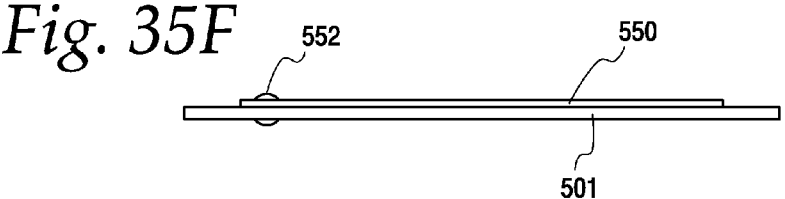
FIG. 35F is an elevational view of another alternate construction of an engagement member wherein the engagement members are movably mounted to the base panel with fasteners.
Figure 36:
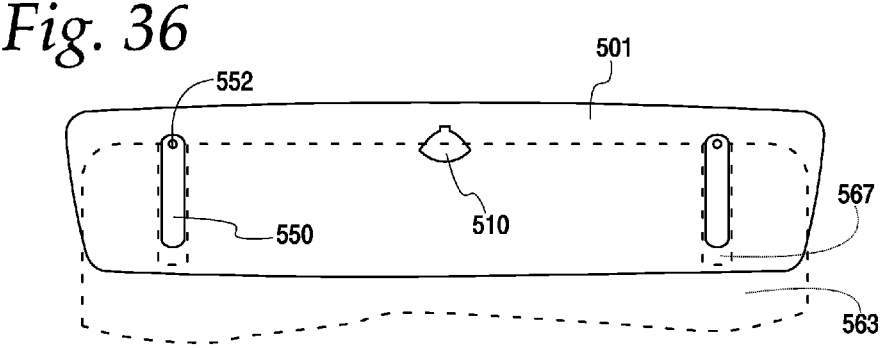
FIG. 36 is a plan view of a base panel with the engagement members of FIG. 35E in place thereon; and, FIG. 37 is a perspective view of an article organizer utilizing bands to affix the base panel thereof to a passenger seat tray table.

FIG. 35F illustrate another embodiment of an organizer where the engagement member 550 takes the form of a tab or bar that is fastened to the base panel 501 by fasteners 552 in a manner that permits the tabs 550 to move, or rotate relative to the base panel 501. These tabs 550 can be rotated toward each other so that they may engage opposing side edges 565 of the tray table 563. Alternatively, and uniquely, the tabs 550 may be moved via rotation in order to align themselves with slots 567 that are formed in the body of tray tables 563 used by some airlines, and which are open at an edge thereof, typically, the top edge 564. The tabs 550 may be inserted into these slots 567 and the tabs and slots will support the base panel 501 in place on the tray table 563, as will an engagement opening 510 formed in the base panel 501.

The article organizers of the present disclosure may be easily formed from a durable plastic by injection molding, and as such the hinge interconnections between adjacent panels may be formed in that process as living hinges. Other means for effecting a hinge may be used, such as adhesive tape or the like. It is even contemplated that a double- or triple-weight cardboard may be used to provide an organizer that is disposable which a passenger may purchase prior to a flight. In other constructions, a light sheet metal such as aluminum may be used provided that the panels are flexibly connected to each other so they can be folded from an operating condition into a relatively planar, storage condition. The blanks of the embodiments preferably have an area footprint of no larger than 12 by 14 inches and when one of the panels is folded upon the other two panels, the resulting footprint is no larger than about 9 by 12 inches and preferably about 8½ by 11 inches, such that in an unassembled condition, the article organizer may easily fit in a file folder, laptop case, briefcase, large purse or the like.

While preferred embodiments have been shown and described, it is envisioned that those skilled in the art may devise various modifications without departing from the spirit and scope of the foregoing Description and the appended Claims.

I claim:

1. An article organizer for use by an airline passenger, comprising:

a blank including at least three panels separated by first and second fold lines, the panels being foldable relative to each other and foldable from an unassembled condition with a flat configuration to an assembled condition with a triangular configuration;

one of the three panels including a base panel extending in a vertical plane for attachment to an airliner structure, a second of said three panels including a support panel that is oriented outwardly in a horizontal plane with respect to the base panel, and a third of said three panels including a brace panel extending in an angled plane with respect to the vertical and horizontal planes; and, the support panel including a plurality of article-receiving openings disposed therein, and the brace panel including a plurality of article-supporting openings disposed therein, each brace panel article-supporting opening being aligned with a corresponding support panel article-receiving opening, at least one of said brace panel article-supporting openings further including an edge with a first support portion that extends transversely underneath a corresponding support panel article-receiving opening to vertically support an article inserted into said article-receiving opening, without the article contacting said base panel for support and at least one of the support panel article-receiving openings having an irregular shape for individually accommodating therein one of at least two articles of different configurations therein, the at least one support panel article-receiving opening including a circular portion that is intersected by an elongated slot defining at least one first notch in the perimeter of the circular portion, and the one brace panel article-supporting opening including a second notch defined in its edge, the brace panel article-supporting opening second notch being spaced apart from and aligned with the one article-receiving opening first notch.

2. The article organizer of claim 1, wherein at least a portion of said base panel is configured to be received within a supporting frame of an airline cabin window.

3. The article organizer of claim 1, wherein said support panel includes a plurality of irregularly shaped article-receiving openings, and said brace panel also includes a plurality of irregularly shaped article-supporting openings, the irregularly shaped article-supporting openings being aligned with the irregularly shaped article-receiving openings.

4. The article organizer of claim 1, wherein said base panel may be folded flat over a portion of the support panel, and said brace panel may be folded flat over a portion of said base panel to reduce the overall configuration of said article organizer for storage.

5. The article organizer of claim 1, wherein said base panel includes an attachment slot which is configured to engage an airline passenger seat table latch such that said article organizer may be attached either to an airline passenger seat or a airliner window.

6. The article organizer of claim 1, wherein said base panel includes a plurality of U-shaped slots which respectively define the airline passenger seat engagement members, said airline passenger seat engagement members including elongated tabs that can be moved out of a plane of said base member to cooperatively define passages that receive portions of a passenger seat tray table therein, and said base panel including a latch opening disposed between two of the U-shaped slots, the latch opening being configured to engage a latch of a passenger seat tray table.

7. The article organizer of claim 1, wherein the one irregular shape article-receiving opening has an hour glass style configuration.

8. The article organizer of claim 1, wherein the elongated slot defines two notches in the perimeter of the circular portion.

9. The article organizer of claim 1, wherein one of the brace panel article-supporting openings also has an irregular shape and is aligned with the one irregular shape article-receiving opening.

10. The article organizer of claim 1, wherein said one brace panel article-supporting opening second notch defines a second support portion of said one brace panel article-supporting opening edge.

11. The article organizer of claim 10, said at least one brace panel article-supporting opening edge first support portion is configured to vertically support an article of a first configuration, and said at least one brace panel article-supporting opening edge second support portion is configured to vertically support an article of a second configuration.

12. An article organizer configured for holding selected items of an airline passenger, the organizer comprising:

at least three panels, adjacent panels being hingedly joined together along edges, the three panels including a vertical base panel, a horizontal support panel and a brace panel extending at an angle between the base and support panel so as to hold said support panel in a horizontal orientation with respect to said base panel, the support panel including first openings configured to accommodate passenger items therein, and said brace panel including second openings aligned with the first openings, the brace panel second openings including horizontal support edges extending beneath said support panel first openings, the horizontal support edges being configured to contact passenger items of sufficient height inserted into said first openings so that only the brace panel second opening horizontal support edges contact and support the items in a vertical direction without the item contacting said base panel for support; and, said base panel including a first attachment opening formed therein for permitting said base panel to fit over a passenger seat tray table latch, said base panel includes at least a pair of U-shaped slots that define elongated tab members of said base panel which are moveable with respect to and out of a plane of said base panel and are configured to engage a portion of an associated passenger seat.

13. The article organizer of claim 12, wherein said brace panel further includes a second attachment opening formed therein for engaging said passenger seat tray table latch, the first and second attachment openings cooperatively have a T-shaped configuration.

14. An article carrier for holding selected items of an airline passenger, the carrier comprising:

a base panel extending in a first plane, the base panel including U-shaped slots that define at least two engagement members which are selectively movable out of the first plane and which are configured to engage a portion of an airline passenger seat, a support panel extending in a second plane at an angle to the first plane and having first openings therein which are configured to accommodate selected items of an airline passenger therein, and a brace panel extending in a third plane at an angle to the first and second planes, the brace panel including second openings aligned with and extending beneath the support panel first openings, the brace panel second opening support edges extending horizontally beneath the support panel first openings, said support edges being configured to contact passenger items inserted into said support panel first openings and support them in their respective support panel first openings without the passenger items contacting the base panel for support, and the engagement members and said base panel cooperatively engaging said passenger seat tray table.

15. The article organizer of claim 14, wherein said base panel includes at least one engagement opening configured to engage a portion of a passenger seat tray table.

16. The article organizer of claim 15, wherein the engagement opening is disposed on said base panel between the at least two engagement members and configured to receive at least a portion of a passenger seat tray table latch therein.

17. The article organizer of claim 16, wherein said engagement opening is disposed on said base panel between said two engagement members.

18. The article organizer of claim 14, wherein said engagement members are elongated tab members which can be moved out of a plane of said base panel to define an intervening space therebetween which receives portions of the passenger seat tray table therein.

19. The article organizer of claim 14, wherein said base panel may be folded flat over a portion of said support panel, and said brace panel may be folded flat over a portion of said base panel to reduce the overall configuration of said article organizer for storage.

20. An article organizer for use by an airline passenger, comprising:

a blank including at least three panels separated by first and second fold lines, the panels being foldable relative to each other and foldable from an unassembled condition with a flat configuration to an assembled condition with a triangular configuration;

one of the three panels including a base panel extending in a vertical plane for attachment to an airliner structure, a second of said three panels including a support panel that is oriented outwardly in a horizontal plane with respect to the base panel, and a third of said three panels including a brace panel extending in an angled plane with respect to the vertical and horizontal planes;

said support panel including at least one article-receiving opening with an irregular shape for individually accommodating at least two articles of different configurations therein;

wherein said base panel further includes at least a pair U-shaped slots that define a pair of tray table engagement members that are movable with respect to said base panel, the slots including elongated tabs that can be moved out of a plane of said base member to cooperatively define passages that receive portions of a passenger seat tray table therein, and said base panel includes a latch opening disposed between two of the U-shaped slots, the latch opening being configured to engage a latch of a passenger seat tray table.

* * * * *